(12) United States Patent
Narayanaswami et al.

(10) Patent No.: US 11,886,398 B2
(45) Date of Patent: Jan. 30, 2024

(54) DATA SUPPLY CHAIN

(71) Applicant: International Business Machines Corporation, Armonk, NY (US)

(72) Inventors: Chandrasekhar Narayanaswami, Wilton, CT (US); Raj K. Nooyi, Miami, FL (US)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 16/803,463

(22) Filed: Feb. 27, 2020

(65) Prior Publication Data

US 2021/0271649 A1 Sep. 2, 2021

(51) Int. Cl.
| | |
|---|---|
| *G06F 16/215* | (2019.01) |
| *G06N 20/00* | (2019.01) |
| *G06F 21/62* | (2013.01) |
| *H04L 9/06* | (2006.01) |
| *G06F 11/30* | (2006.01) |
| *G06F 9/54* | (2006.01) |
| *H04L 9/00* | (2022.01) |

(52) U.S. Cl.
CPC .............. *G06F 16/215* (2019.01); *G06F 9/54* (2013.01); *G06F 11/3072* (2013.01); *G06F 21/6254* (2013.01); *G06N 20/00* (2019.01); *H04L 9/0637* (2013.01); *H04L 9/50* (2022.05)

(58) Field of Classification Search
CPC ...... G06F 16/215; G06F 9/54; G06F 11/3072; G06F 21/6254; G06N 20/00; H04L 9/0637; H04L 2209/38
USPC ........................................................ 707/692
See application file for complete search history.

(56) References Cited

U.S. PATENT DOCUMENTS

| | | | |
|---|---|---|---|
| 8,510,176 B2 | 8/2013 | Smith | |
| 8,612,307 B2 | 12/2013 | Smith | |
| 10,320,813 B1* | 6/2019 | Ahmed | ............... H04L 63/1416 |
| 10,540,654 B1* | 1/2020 | James | .................. G06Q 20/223 |
| 2011/0187598 A1* | 8/2011 | Dai | ......................... G01S 19/23 |
| | | | 342/451 |
| 2012/0173436 A1 | 7/2012 | Smith | |
| 2013/0104105 A1 | 4/2013 | Brown et al. | |
| 2015/0379510 A1 | 12/2015 | Smith | |

(Continued)

FOREIGN PATENT DOCUMENTS

| | | |
|---|---|---|
| CN | 104410701 A | 3/2015 |
| CN | 110264302 A | 9/2019 |
| JP | 5665493 B2 | 12/2014 |

OTHER PUBLICATIONS

Microstrategy, "Global State of Enterprise Analytics," https://www.microstrategy.com/us/go/global-state-of-enterprise-analytics-2018, accessed on Feb. 19, 2020, 2 pages.

(Continued)

*Primary Examiner* — Hosain T Alam
*Assistant Examiner* — Nicholas E Allen
(74) *Attorney, Agent, or Firm* — Scully, Scott, Murphy & Presser, P.C.; Daniel P. Morris

(57) ABSTRACT

A data supply chain can include functional blocks, which can automatically perform stages of data supply chain, which can include data discovery catalog, data contract negotiation, data preparation, data authentication and authorization, data usage and metering, data contract settlement, data disposal and data forensics and reporting. Information from one or more of the stages can be recorded.

20 Claims, 17 Drawing Sheets

(56) References Cited

U.S. PATENT DOCUMENTS

| | | |
|---|---|---|
| 2017/0178087 A1 | 6/2017 | Barnett et al. |
| 2018/0268483 A1* | 9/2018 | Jayaram ................. G06Q 40/04 |
| 2018/0268506 A1* | 9/2018 | Wodetzki ............. G06V 30/413 |
| 2019/0080392 A1* | 3/2019 | Youb ..................... H04L 9/0643 |
| 2019/0132350 A1* | 5/2019 | Smith ................... G06F 21/577 |
| 2019/0171620 A1* | 6/2019 | McCollum ............ G06F 16/137 |
| 2019/0188787 A1* | 6/2019 | Besanson Tuma ... G06F 16/215 |
| 2019/0379699 A1* | 12/2019 | Katragadda ......... H04L 63/1425 |
| 2019/0394243 A1* | 12/2019 | Wiig .................... H04L 9/0637 |

OTHER PUBLICATIONS

Tom Coughlin, "175 Zettabytes By 2025," https://www.forbes.com/sites/tomcoughlin/2018/11/27/175-zettabytes-by-2025/#174557485459, published Nov. 27, 2018, accessed Feb. 19, 2020, 5 pages.

C. Narayanaswami, et al.; "Blockchain anchored supply chain automation," IBM J. Res and Dev, Mar./May 2019. pp. 7:1-7:11, vol. 63, No. 2/3. (Grace Period Disclosure).

NIST, "NIST Cloud Computing Program", http://csrc.nist.gov/groups/SNS/cloud-computing/index.html, Created Dec. 1, 2016, Updated Oct. 6, 2017, 9 pages.

* cited by examiner

UI FOR DATA SUPPLY CHAIN

| DATA COMPLIANCE | DATA FORENSICS | DATA USAGE | DATA DISPOSAL | DATA USEFULNESS |

| NAME | USED BY | DATE AND TIME | LOCATION/IP ADDRESS | BLOCKCHAIN SIGNATURE |
|---|---|---|---|---|
| CAT PICS | CAT FOOD SERVICE | XXXX-XX-XX XX.XX GMT | LOCATION 1 | MEU6F344GTDRCYA0EW49 |
| DOG PICS | DOGWALKINGAGENCY | XXXX-XX-XX XX.XX GMT | LOCATION 2 | ZKYUM3450ABNY878CEDFG |
| ABC SALES | GLOBAL ADS, INC. | XXXX-XX-XX XX.XX GMT | LOCATION 3 | MKYUC45769EU789CV473 |
| POT HOLY | ZKP TRUCKING SERVICE | XXXX-XX-XX XX.XX GMT | LOCATION 4 | YUCNS3458CVERF89BNIUT78 |
| POT HOLY | CHEAP FREIGHT – UNAUTHORIZED ATTEMPTED USE | XXXX-XX-XX XX.XX GMT | LOCATION 5 | WHILE345CYN7USFDKL989C |

FIG. 5

DATA SUPPLY CHAIN

STATEMENT REGARDING PRIOR DISCLOSURES BY THE INVENTOR OR A JOINT INVENTOR

The following disclosure is submitted under 35 U.S.C. 102(b)(1)(A):
DISCLOSURE: Blockchain anchored supply chain automation, C. Narayanaswami et al., IBM J. Res. & Dev. Vol. 63 No. 2/3 Paper 7 March/May 2019.

BACKGROUND

The present application relates generally to computers and computer applications, and more particularly to automation of a process involving data supply, for example, in data science.

The implementation of artificial intelligence (AI), for example, machine learning, over the past years has increased the awareness for the value of data and the need for the current technology to benefit from it remain viable. Improvements in data science platforms continue to advance machine learning analytics and prediction techniques. However, the vast variety and dispersion of available data, coupled with the variability in quality and procurement timeliness of relevant data to determine insights that are time sensitive can make data mining, for example, in machine learning technology, difficult.

BRIEF SUMMARY

A data supply chain system and method can be provided. The system, in an aspect, may include a hardware processor and a memory device coupled with the hardware processor. The hardware processor can be configured to facilitate discovery and cataloging of data. The hardware processor can also be configured to facilitate automated data contract negotiation associated with the data. The hardware processor can also be configured to prepare and authenticate the data based on the data contract. The hardware processor can also be configured to monitor data usage of the data. The hardware processor can also be configured to perform automatic data contract settlement. The hardware processor can also be configured to, responsive to automatically determining expiry of the data contract, perform data disposal. The hardware processor can also be configured to perform automatic data forensics. In an aspect, the hardware processor can be configured to record information associated with discovering, facilitating, preparing, monitoring, performing automatic data contract settlement, performing data disposal and performing automatic data forensics.

A computer-implemented method, in one aspect, can include facilitating discovery and cataloging of data. The method can also include facilitating automated data contract negotiation associated with the data. The method can also include preparing and authenticating the data based on the data contract. The method can also include monitoring data usage of the data. The method can also include performing automatic data contract settlement. The method can also include, responsive to automatically determining expiry of the data contract, performing data disposal. The method can also include performing automatic data forensics. Information associated with discovering, facilitating, preparing, monitoring, performing automatic data contract settlement, performing data disposal and performing automatic data forensics can be recorded.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 5 shows an example data supply chain user interface in an embodiment.

DETAILED DESCRIPTION

Figure 1:
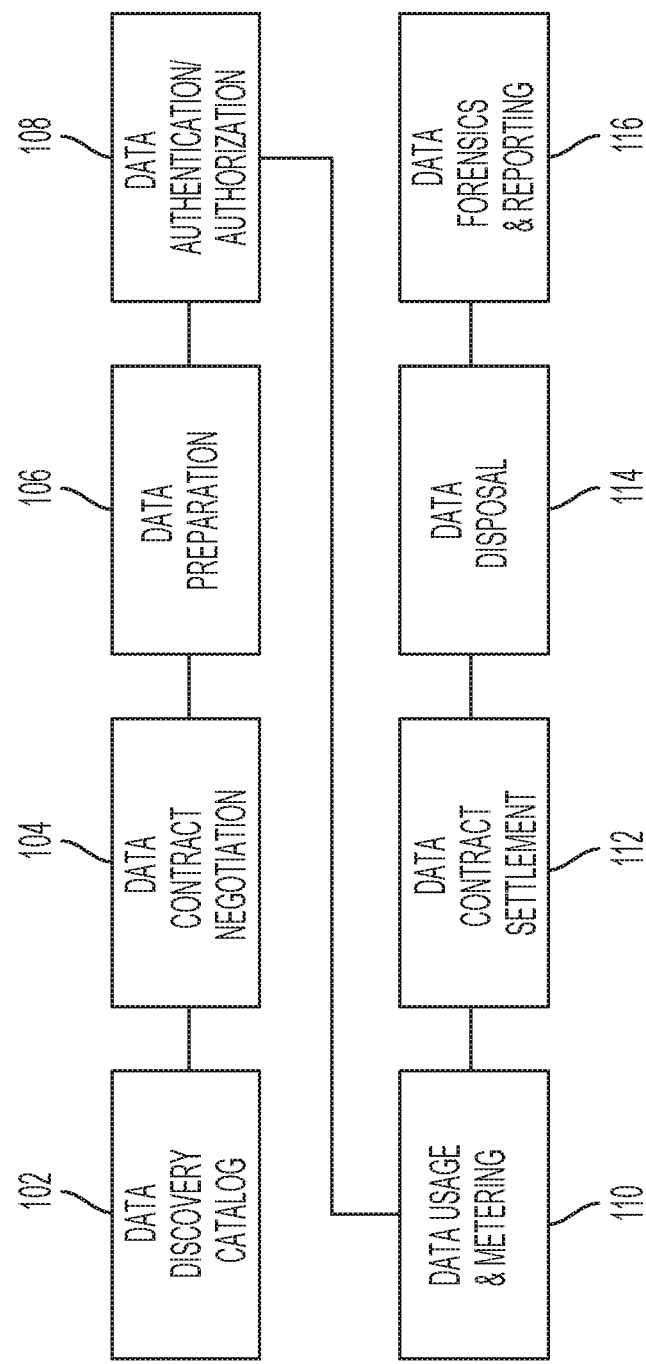
FIG. 1 illustrates functional blocks of a data supply chain in embodiment.

In embodiments, a system, method and technique can be presented, which address an automation of using data through various stages. In an embodiment, such various stages are referred to as "data supply chain", and can include, but are not limited to: cataloging and finding the data; procuring the data with machine mediated contracts; testing of suitability of the data; obtaining granular rights to the use of data; usage monitoring and payments; deletion of data; and providing forensics and reporting on the use of data. In an aspect, such data supply chain can create a global data marketplace, which can be efficient.

In embodiments, a system, method and technique can provide an automation of locating and provisioning the right data or subset of data, e.g., when needed, at the right granularity and price while incentivizing and leveraging "crowd participation" to ensure accuracy, freshness, and ubiquity, and facilitation of automated data disposal and data forensics for compliance and reporting.

The system, method and technique, for example, may promote fine grained sharing of data in a dynamic fashion across users of various sizes. For example, the system, method and technique can curate bulk and fine-grained data on demand for use by traditional users as well as software services and micro-services, e.g., by providing a descriptive catalog with data certifications and meta data via an ecosystem of data providers that allows for creation of dynamic data contracts, by selecting and customizing contract templates drawn from a contracts template library, compliant with applicable regulatory requirements.

In embodiments, a system, method and technique can provide machine learning-based automatic metadata, data ratings and rankings, bias detection and reduction, and contract generation. Data such as the operations at every stage of the data supply chain may be recorded or stored. In an embodiment of an implementation, such data may be stored in one or more centralized databases. In another embodiment of an implementation, such data may be stored or recorded in blockchain, e.g., utilizing a blockchain network. For instance, the system, method and technique may leverage blockchain for providing trust and provenance.

In an embodiment, the system, method and technique may use blockchain to record the operations at every stage of the data supply chain. Members of this blockchain network may include the data providers, the data subscribers, the entities that provide payments and settlements functionality, participants in a particular stage of the data supply chain who may provide value added services or act as brokers, certifiers, or rankers of data, and regulators who may have a legal right to inspect the data, and/or others. Parties in the blockchain network may have selective visibility to data. For instance, not all parties in the blockchain network may have visibility into all data that is stored in the blockchain. Information in the blockchain may be segmented for access by channels to facilitate data discovery and use while preserving value that accrues from curating and providing data. Information and logs from key operations at every stage may be sent to the blockchain to maintain a trusted log for the usage and disposal of data and forensic analyses. This can include queries and requests for data, data contracts and pricing, data usage logs, feedback on data quality and relevance, data disposal logs, the AI or machine learning models that were trained on the data, reports on bias found in the data, and/or others. Data stored in the blockchain can also be used to automate payments and settlements, proving regulatory compliance, collecting authentic ratings and reviews, and/or others. Another aspect of blockchain technology is smart contracts, which include pieces of code that can be triggered and executed when specified events happen.

In an embodiment, an operation of a data supply chain may include, but are not limited to: data sourcing and catalog; automated data contract negotiation; data preparation; data authentication and authorization; data usage and metering; data settlements and payments; data disposal; and data forensics and reporting.

Data discovery catalog and sourcing can provide metadata about the data, which describes the data contents. In an embodiment, a methodology herein can extend traditional metadata that includes information about data fields and ranges with certificates for the data provider, usage information of the data, ratings and rankings for the data, and any bias information that the data may have.

Automated data contract negotiation can include a machine readable data request that specifies the purpose for the data request, requested temporal or geographical range for the data, and other user specified or domain specific filters for the data. Providers that satisfy the criteria may provide a response along with pricing information for the data for trial and volume usage. A set of tests, provided by the requester, may also be performed on the data to verify the suitability of data. Based on the results, a contract can be established after payment information is received, authenticated and authorized.

Data preparation can include advanced tests for data anonymization, and automated creation and testing of data samples that are generated before spawning off bulk data creation.

Data authentication and authorization can provide access to individual services or micro-services for data access, e.g., based on authentication.

Data usage and metering can include tracking data usage at a service and micro-service level and also billed at that granularity. The usage of auxiliary resources such as central processing unit (CPU), memory, storage, containers, virtual machines, and network can be measured and tracked.

Data contract settlements and payments can allow billing and settlements to occur at a fine granularity if needed on a service and/or micro-service level.

Data disposal allows for data to be automatically deleted upon fulfillment of the terms of the contract, after the contract duration or after the date at which the data is set to expire. A data contract may be proactively renegotiated prior to the expiry of the existing data contract.

Data forensics and reporting can record the usage of data by services and micro-services, by date, time, geography, etc., and ensure compliance with the contract terms and regulatory requirements, and also ensure that any machine learning models that had earlier used data that is now revoked for any reason are invalidated. Reports can be provided regarding who used the data and for what purpose and when it was used. In an aspect, blockchain can be used to record the operations at every stage of the data supply chain. In another aspect, data such as the operations at every stage of the data supply chain may be recorded or stored in one or more centralized databases. Data from key operations at every stage can be sent to the blockchain to maintain a trusted log for the usage and disposal of data.

The following further describes above-described functional blocks in a data supply chain in an embodiment. In an embodiment, the data supply chain can operate in the cloud. For example, an enterprise can operate a data supply chain for its internal use and keep it on premises. The data supply chain can operate in another cloud environment or computing environment. In an embodiment, a data supply chain can facilitate automation in each step from discovery of the data to generation of insights. FIG. 1 illustrates functional blocks of a data supply chain in embodiment. The function blocks can be implemented or run on one or more processors or hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

FIG. 1 breaks a data supply chain process into smaller steps, each of which can have a specific function and purpose. In an aspect, dynamic provisioning of data, which is specifically targeted to an end-to-end process objective, can be more valuable than traditional static roles based data provisioning contracted in bulk. As an example, a trucking company may find it worthwhile to procure weather data only for the routes it supplies on and that too only in situations where the weather is extreme or deviates significantly from what is expected for that location and time. One of the next steps after discovering the data via a description in a catalog can be obtaining a subset of the data that is needed for the specific purpose. This process can broadly falls under data provisioning. The data set may be assembled and provisioned on an as-needed basis automatically and in near real-time.

Data discovery catalog (and, e.g., related services) functional block 102 may provide information such as the name of the data set and description of the data set. For example, a weather data set may include the geographies for which the weather information is included, the time horizons covered, and metadata that includes a description of elements in the data such as high and low temperatures, humidity, precipitation forecasts, etc. The data discovery catalog functional block 102 can also provide descriptions associated with information provided about the usage restrictions on the data, the uses for which the data has been successfully used and by whom, the regulatory and compliance tests that have been passed, the uses for which the data has been certified, the method used to gather or collect the data, data regarding any bias that may be inherent in the data set, e.g., data is overrepresented in a certain demographic, or the inherent biases that were present in the data collection mechanism, etc. For example, usage information of the data may include that it is suitable for use in a specific industry, e.g., the chemical industry; ratings and rankings for the data may compare the data with other data sets with similar information, and list any bias information that the data may have such as lack of demographic diversity, etc. A set of data ontologies may be included in the catalog so requesters can use software apriori to parse the details of the available data. Examples of ontologies may include ones for weather data, demographics data, satellite imagery, event data, etc. The data supply chain in an embodiment can further allow such data to be provided programmatically upon enquiry via an application programming interface (API) for the data and to automate the discovery of data that meets a set of filters or parameters.

A sample query API call can look like the following:
get_data_details (data_provider, data_capture_method, date_range, use_case_description, data_ratings, bias_description).

In an embodiment, information and logs related to the catalog can be stored in a blockchain. For example, user or auditor provided data ratings can be verified and authenticated. Blockchain technology can enable trusted data ratings by ensuring that they are cryptographically signed and verifiable. Similarly timestamps and location data for catalog searches may be saved in the blockchain to prove compliance. The proof of authenticity of the data source can also be recorded into the blockchain to facilitate purchases of data.

The following illustrates an Entertainment as a Service (EaaS) application example. Content consumers may source content (e.g., audio, video, games, etc., in digital format from multiple channels) from web-based radio stations, music subscription services, content creators, etc., to either consume digital content directly or to assemble a library (playlists) classified into various genres to suit specific consumption patterns, occasions and devices. The responsiveness necessary to support varied and shifting preferences over time to provision and deliver content variety, across distribution methods with time-sensitive pricing and offer bundles in a global marketplace can benefit from efficient and effective content discovery. This discovery of content can be enabled by the content producer/distributor, to support the construction of content and offers tailored to specific consumer preferences for maximum value extraction. Additionally, such content discovery capability can also be used to support adjoining products, e.g., concert tours and merchandise promotions that are being marketed by the content producer/distributor. These independent products can be also used to build demand for digital content and to market the content producer/distributors' overall portfolio of products/offers to content consumers. Furthermore, when supporting concert tour interest, complementary data in support of the content consumers' interest in attending the concert—weather, transportation alternatives/routes, hotel offers, etc., can be also relevant and can improve service levels and increased value extraction/revenues due to the enablement of effortless and frictionless transactions. The data discovery catalog can contain data and metadata that support this rich and complex consumer environment and also can be capable of "learning" to include data and metadata to support market dynamism and evolving relevancy.

For example, the data discovery catalog functional block can provide: data category and attributes such as origin and certifier, data bundle offers, geographic location, time range, granularity, etc., expiry; data description such as data model, APIs and metadata providing information such as who used it, used for what, data ratings, data bias information, and usage limitations.

For instance, the data discovery catalog functional block elements can include data category and attributes element and data description element, which can facilitate automated discovery of data. The data category and attributes element can include: published certificate providing information on data source, inspection, registration information, expiration data, and/or others, for example, for each data category such as product, person, event, bundles, and/or others; segmentation filters, e.g., by geography, time period, demographics, cohorts, brands, and/or others; and regulation/compliance requirements such as usage restriction governed by government and/or industry regulations. The data description element can include: data model including description of data element, their inter relationship, hierarchy, and/or others; APIs which may describe interfaces to query for and to obtain data, make payments, provide access keys, and/or others; metadata which may specify a list of users and purposes used for, list of users who requested data but did not buy it, most common data filters applied, segments requested, user data ratings, auditor data ratings and compliance certification, data bias information, purposes of which data can or cannot be used.

The data supply chain may automatically curate bulk and fine-grained data on demand for use by traditional users as well as software services and micro-services. In an embodiment, by providing a descriptive catalog as described above with data certifications and metadata via an ecosystem of data providers, the data supply chain in an embodiment can allow negotiation and creation of data contracts and reduce the need for manual intervention in the loop.

Aspects of automated data contract negotiation, for example, performed in the data contract negotiation functional block 104, can include a machine-readable data request that specifies the purpose for the data request, requested temporal, geographical bounds for the data, and other user specified or domain specific filters for the data. Other negotiable parameters can include guarantees to keep the data fresh and clean for the duration of the contract. Liability issues on usage of data may be spelled out as well. This may be similar to digital rights management (DRM) for use of images (e.g., can be used for any purpose, can be used but attribution to be provided, can be used with modification, etc.). Providers that satisfy the criteria may provide a response along with pricing information for the data for trial and volume usage. A set of tests, provided by the requester, may also be performed on the data to verify the suitability of data for use by the requester.

Pricing information for the data may be exchanged either before or after verifying the suitability of the data. This can include the type of pricing—subscription based, volume based, outcome based, outright purchase for perpetual use, etc., and may include the contractual terms for the pricing and usage such as number of users and license. Based on the results of the data testing, a contract can be established after payment information gets exchanged. Payment information includes the mode of payment such as credit card, smart wallets, ACH, direct debit, third party payer, credit line, crypto tokens, in-network tokens/currency, etc. A traditional payment verification system can be included to verify the payment credentials.

"Crowd-authorized" standard data contract templates can be maintained to support the diversity of contracting needs and minimize the complexity associated with real-time contract development and finalization.

Elements of the data contracting process and the contract itself can be documented in the blockchain. This can reduce the number of disputes related to terms of the contract, billing, associated payments, etc. Encrypted copies of payment credentials, etc., may be entered into the blockchain to record and track such information. By way of example, if special pricing such as surge pricing was used for and agreed to in the contract, it may be recorded to avoid billing disputes. The exact data that is recorded on the blockchain can be dependent on various factors such as governing regulations, exact processes that are automated by the blockchain, etc.

The following illustrates an example of data contract negotiation in EaaS application. Once the content consumer has indicated content purchase preferences, the content producer/distributor determines the buyer's suitability to access and consume that content prior to authorizing the transaction. For example, the Motion Picture Association Film Ratings (e.g., G, PG-13, etc.) can define the suitability of content for various demographic cohorts. Similar rating schemes exist across geographic and governmental jurisdictions across the world. When serving up content to the consumer, content producers/distributors need to be compliant with viewer permissions consistent with the geographic or governmental jurisdiction that they consume content in. Furthermore, the content consumers' usage intent and rights, along with their ability to purchase are also ascertained by the content producer/distributor to determine the appropriate offer bundle and associated pricing along with its accompanying constraints/flexibility to ensure a high likelihood of a productive outcome for both the content consumer and the content producer/distributor. In such a scenario, constructing the offer typically may include factors that measure the content consumer's frequency of purchase, recency of purchase, cumulative value of purchases over a defined time-period, loyalty index, etc.

The content producer/distributor can warrant content quality, define the content consumption points and time horizon, consider offers of "try before buy", up-sell/cross-sell promotional considerations, user feedback/ratings, current popularity/momentum, artist/producer required constraints, contract type, etc.

The data contract negotiation functional block may automate one or more of the portfolio of above-mentioned capabilities, for example, using a rules engine, constructing and managing mutually beneficial and productive offer(s) by the content producer/distributor to ensure a positive contract negotiation outcome.

In an embodiment, the data contract negotiation functional block 104 can provide capabilities such as data request detail (e.g., requestor, usage purpose, usage time range, data range (geography, time, other filters), data pricing and terms (e.g., volume pricing, bundle pricing, trial pricing, outcome pricing, single use, expiration data, etc.), and data payment detail (e.g., financial institution, prepayment credit, funds replenishment).

The data contract negotiation functional block 104, which can facilitate automated negotiations of data contracts, can include elements such as data request detail, data pricing and terms, and data payment details. Data request detail element can provide buyer informer (e.g., buyer identity information needed for qualifying the transaction and improving metadata, e.g., industry segment, functional department, etc.), provide usage intent information (e.g., by data category relating to the what, when, where, how and why, by leveraging various segmentation filters (e.g., geography, time period, demographics, cohorts, brand, etc.) and provide buyer agreement on data quality and suitability resulting in outright purchase or trial outcome dependent decision.

Data pricing and terms element of the data contract negotiation functional block 104 can include pricing library (e.g., historical market price, trial pricing, surge pricing, volume pricing, bundle pricing, time-window pricing, subscription based pricing, outcome base pricing, geography dependent pricing), contractual terms (e.g., time period, deletion, number of users, usage frequency, etc.), capabilities to select and agree to pricing and contractual terms related to outright purchase or trial outcome dependent decision.

Data payment details element of the data contract negotiation functional block 104 can include payment options, credentials authentication, payment authorization and processing, e.g., by credit card, smart wallet, ACH, direct debit, third party payer, credit line, crypto tokens, in-network tokens/currency, etc.

In an embodiment, a data preparation functional block 106, e.g., based on a negotiated data contract (e.g., by the functional block at 104), can prepare data pursuant to the terms agreed to in the data contract.

There can be several elements in the data preparation stage. For instance, data preparation elements can include data curation (e.g., curation of data or subsets of data), automated sample testing, geographic placement and location, and DRM activation. The data curation element can curate and prepare data for buyer per contract terms, e.g., source and assemble data from multiple sources, remove redundant information, etc. Curation of data or subsets can include additional cleansing, de-duplication, de-identification, advanced anonymization, volume creation and sample creation. The automated sample testing element can curate data to evaluate fit for purpose via trial usage, and facilitate verification of data cleanliness, completeness, richness, granularity, validity, and suitability, etc. The geographic placement and location element can place data in dispersed geographic locations to meet performance requirements, cost constraints, and regulatory compliance. The DRM activation element can activate enforcing agreed to contractual terms, for example, activate DRM to manage agreed to contractual terms and record in the blockchain. Some providers of data may also provide certified code that provides access to the data. Such code may be provided as certified modules or certified containers (e.g., a Docker Container).

The data curation processing may involve combining and joining data sets from multiple sources, for example one data set may cover one time period, and another may be able to extend the coverage to a longer period. Other processes in the curation stage may include the deletion of fields, e.g., which are deemed unnecessary, for example names and other sensitive information. For example, some information may be potentially okay to provide in evaluations of efficacy of health treatments but not in other use cases. Removal of Personally Identifiable Information (PII) is an operation that can be performed. Advanced tests for anonymization may also be included. In some cases, due to limited sample sizes, such as there being only few data points in a rural zip code, more advanced forms of anonymization may be necessary and is supported. In other cases a small amount of noise/jitter may be added to make the data less identifiable and more secure. Automated sample testing can also be performed. This saves aggravation for both the seller and the purchaser of the data. For example, time and effort need not be spent on creating full data sets before verifying the suitability with smaller data sets. Examples may include extraction of data for a subset of zip codes and time periods. The steps in the data cleansing/curating process may themselves be recorded on the blockchain and retrieved when documentation about the cleansing and curation process is sought, for example by an analyst or auditor.

The next set of instructions in the data contract may include the geographic placement of the data sets to ensure compliant and performing systems. A set of DRM capabilities and policies that go beyond the traditional functionality of provisioning and governing the contract may be deployed to ensure proper access to the data. These policies may be deployed on on-premise instances of the data or on cloud-based instances. APIs and App Keys can be used for enforcing DRM.

In an embodiment, details about the data preparation process may be captured in the blockchain. An example is the geographic placement of data to prove that regulations associated with types of data are being complied with. If data is assembled from multiple sources, the facts about the process can be recorded to prove the lineage of the data. Details of the DRM contract may be stored in the blockchain also. If data is cleansed or derived, the process used for such cleansing or derivation also can be recorded.

The following illustrates an EaaS application example. Depending on the composition of the offer accepted by the content consumer, the data preparation task may be simple or complex. A single song provisioned by the content producer/distributor with perpetual rights for playback may include incorporating it with traditional DRM controls, thereby permitting the content consumer to enjoy it on a single consumption point.

At the other end of the spectrum, a syndicated offer by the content distributor for a genre of music compiled from content sourced from across multiple content producers, coupled with tickets to a concert in a specific location/date, with affiliated co-marketed merchandise and hotel and transportation arrangements supplemented by calendaring, reminders and logistical support, can require complex orchestration of provisioning, contracting and settlement capabilities with more involved regulatory compliance requirement and usage management.

These two bookends, not factoring the complexity induced by the "content returns" process provide a good understanding of the marketplace needs. They can define the spectrum of possibilities in offer construction and its dependency on a variety of data sources, intelligent amalgamation of adjacent products and transaction management and settlement capabilities, which can be provided.

In an embodiment, the data authentication functional block 108 may provide data access to individual services and/or micro-services, and can establish credentials and tokens, e.g., enterprises access, third party access, delegated access, role-based access, micro-service based access. The data authentication functional block 108 can include direct access, delegated and federated access, and service based access. Direct access can establish credentials for enterprise or user based access. Delegated and federated access can establish tokens for delegated and federated access and establish credentials for role-based access. Service based access can establish credentials and/or tokens for use by micro-services.

The data authentication functional block 108 can provision credentials for use by enterprises and individuals, for example, credential models around single sign-ons. Further trust credentials may be shared with service partners through known mechanisms of federated sign-ons. Credentials may also be valid for a workflow, covering all the actors involved in the workflow, where each actor has access to the information/authority needed, e.g., "E2E process objective based data credentialing".

The data authentication functional block 108 can also provide credentials to individual micro-services, allowing purchasers of the data to share data or subsets of the data with others. These credentials can be automatically set up as part of the data curation.

In an embodiment, the creation of the authentication of tokens may be stored on the blockchain to record details such as who, what, when, and where information about tokens. This may include the period for which the tokens are valid, who can use them, where can they be used from, and for what purpose can they be used.

The following illustrates an EaaS application example. Powerful capability to create, edit and produce digital content cost-effectively, has powered the explosion of user created content. Additionally, with the emergence and prevalence of the World Wide Web, cellular telephones and micro payment platforms, user created content now can reach content consumers worldwide easily and cost-effectively. This development can present different scenarios from centrally produced, curated, controlled and distributed content. Such development may drive the demand by content consumers for much finer/granular sourcing and consumption of content in real-time, a new paradigm. In an embodiment, dynamically spawned "service requests" from the different functional components of the data supply chain can interact with various systems—content hosting, billing, settlements, etc., designated to provide these services in an automated environment. These automated service requests can have intrinsic trust feature(s) built into them and can be rigorously authenticated to ensure a trusted, provenanced, efficient and well-functioning marketplace.

Data usage and metering functional block 110 can facilitate tracking data usage and billing pursuant to data contract. The data usage and metering functional block 110 may track usage by institution, access credential, geography, time, etc., run time checks on usage, perform auxiliary resource usage such as CPU, graphics processing unit (GPU) main memory, storage, input/output (I/O) network, etc., check prepayment credit balance, issue credit replenishment trigger, etc.

The data usage and metering functional block 110 can includes elements such as data storage and usage monitoring, auxiliary resource monitoring, and credit balance monitoring and replenishment. The data storage and usage monitoring element may track data usage by access credential, time epochs, geography, data segments, etc., monitor compliance of data usage with contractual terms during run time, tag stored data copies for deletion compliant with terms of usage to facilitate detection, and log metadata related to data and model usage for forensics and reporting. The auxiliary resource monitoring element may track usage of resources associated with data such as CPU, GPU, memory, storage, I/O, containers, virtual machines, network, energy, etc. Containers (e.g., existing techniques for container and data center orchestration and/or services tools can be used, etc.) and Virtual Machines may be inspected and certified to restrict what they access in terms or resources. The resource monitoring element may also check that the container has not changed since the time of certification. This can be done by standard techniques such as signing a non-invertible hash of the checksum of the executable. If the code in the container has changed, it can be blocked from execution, thus preventing unauthorized access to the data provided by the data supply chain. The credit balance monitoring and replenishment may aggregate costs, reconcile against available credit, and revise credit balance.

Data usage can be tracked at various levels ranging from enterprise usage to a service and micro-service based usage, so the usage can be billed at the desired granularity. Usage of primary resources such as storage can be tracked. The usage of auxiliary resources such as CPU and network can be also measured and tracked. Such resources may be needed to fetch the data and provide it when an API request for the data comes in. Modern systems may also deploy data processing accelerators such as GPUs (Graphics Processing Units). Custom circuits on field programmable gate arrays (FPGAs), application specific integrated circuits (ASICs), etc., may also be designed expressly for the purpose of data manipulation and curation. In such cases, the utilization of such assets can also be tracked. Container utilization and network bandwidth also can be tracked, and energy consumption, if appropriate, may be tracked. Data usage and metering information, e.g., appropriately aggregated and/or segmented and analyzed can be effectively utilized to improve the efficiency and operating cost of the data supply chain infrastructure.

This module 110 may also keep track of the running total of the credits still remaining on the account, and proactively renew the credits prior to depletion of balance, below a threshold/floor, for example. The module 110 may also log metadata related to the data usage for reporting and forensics purposes. Any instructions to explicitly delete datasets after usage can be also issued by this module 110.

Multiple aspects of data usage may be recorded on the blockchain for purposes of billing, settlement, and proof of compliance. Access to data, location of data access requests, timestamps related to usage, and identities related to data access can be prime candidates for capture in the blockchain. Usage of various resources such as memory, CPU, GPU, FPGAs, containers, etc., can also be recorded to provide itemized blockchain backed billing.

The following illustrates an EaaS application example. In the media and entertainment industry's dynamic and constantly evolving world of many content producers, distributors, pricing/business models and consumption patterns, monitoring (with provenance) and accurately tallying content provisioning and consumption can be performed to ensure fidelity of the monetization model(s) and the appropriate allocation of proceeds to participants (content producers/distributors) in the content value chain. Accurate monitoring and provenance can facilitate retaining the confidence of content consumers in the fiscal integrity of the marketplace and for rapid dispute resolution. Furthermore, multiple core and auxiliary resources can also be utilized to provision content, monitor usage and service/renew the content consumer's ongoing engagement. The integrity of monitoring and metering usage of these auxiliary resources can be part of an ongoing fabrication and/or configuration of profitable offers, and an allocation of the revenue and affiliated costs/royalties consistent with the terms of the contracts across the participants (content producers/distributors) that make up the value chain.

Data contact settlement functional block 112 can deal with traditional payments and settlements for usage of data, e.g., bill data and resources usage pursuant to contract. It may also include proactive reminders to renew contracts prior to expiration. Billing and settlements can happen at a fine granularity if needed on a service/micro-service level. Alternate financing options may be provided.

The data contact settlement functional block 112 can facilitate financial transactions per contract terms and usage/metering, generate invoice, reconcile purchase order (PO), issue receipts, proactively renew data contract before expiry and recommend data bundles based on usage. The data contact settlement functional block 112 can include payment and settlement element and dataset offers element. The payment and settlement element can generate invoice and reconcile against contractual agreement to collect payment, and offer credit facility, alternate payment options, and terms upgrades. The dataset offers element can proactively renew data contract before expiry, and recommend data bundles based on buyer and broad community usage.

Aspects of this module 112 can include the recommendation of data bundles, which may be relevant to the use case for the users based on broad community usage. For example, newer and more relevant data sets may have appeared in the data catalog for use cases since the user signed a data contract. The module 112 can also include provisions to capture the user's satisfaction metrics with the data for their use case. In an embodiment, since the ranking and rating data is continuously updated, the updated information is also communicated to the user, e.g., periodically or at contract renewal time. This facilitates proactively looking for data sets to recommend during the course of the contract and at contract renewal time.

Data that may be stored on the blockchain related to this stage may include payments on invoices, any disputes related to invoices that are raised. Offers that were presented for data bundles, notices for contract renewals, etc., may also be recorded to prove that notices for contract renewals were sent and no responses were received and therefore data was deleted per terms of the original contract.

The following illustrates an EaaS application example. In the entertainment industry, depending upon the content producer, the genre of music, the content distributor, the consumption point, the timing of the sale, etc., the allocation of profit to the participants in the content value chain can/will be different.

This functionality facilitates the monetary settlement(s) based on the monetization model associated with that particular transaction(s) among participants in the content value chain. To illustrate this point with a simple example, in this case between the content producer, the content distributor, and the consumption point facilitator with minimal to no friction, consistent with the terms and conditions agreed to by the data contract negotiation component. Additionally, access to content consumer purchase data by contract management software can enable the proactive processing of renewal proposals before contracts expire and leveraging pertinent content consumer purchase behavior data to facilitate the crafting of relevant offers for placement in an offer library. The data resulting from the monitoring of the economics of these newly constructed offers and their adoption rate by content consumers can also be useful in proposing modifications and enhancements to the rules engine for use by the data contract negotiation component.

In an embodiment, the data disposal functional block 114 can automatically deal with locating and deleting all copies of the data that need to be deleted upon expiration of contracts or upon request. Data is automatically deleted after the contract duration or after the date at which the data is set to expire. A data contract renewal may be proactively renegotiated prior to the expiry of the existing data contract. The data disposal functional block 114 can automatically locate and delete dataset(s) after contract expiry. The data disposal functional block 114 can include a data deletion element, which locates and deletes data and all replicas from different geographic locations, and provide certification that dataset(s) was or were deleted. A Blockchain registry may provide the ability to efficiently locate and access the data provisioned wherever it may reside to enable its rapid location and deletion.

In an embodiment, the deletion can be recorded on the blockchain and can be made available upon request to entities and agencies that have a right to seeing that data. This module 114 also can maintain logs and analytics on how long the data set is used on average and include that data in the data catalog as metadata. Data disposal logs may be recorded in the blockchain to prove that terms and obligations related to established contracts have been executed. For example, proof of deletion of all copies of data and the date of such deletions may be recorded on the blockchain.

The following illustrates an EaaS application example. Depending on the contractual terms agreed to by the content consumer for the content provisioned, during various points in the life of the contract or upon the conclusion of the contract term, the DRM engine can locate and inhibit content usage, e.g., pause or delete, from one, some or all of the consumption points/devices. These "data disposal" confirmations/records can also be used to infer content consumer cancellation tendencies, e.g., partial renewals, non-renewals, early terminations, etc., and facilitate analyses of product quality, quality of service, competitive positioning, offer value, etc. Furthermore, it can certify the compliance of the content consumer to the agreed upon contract terms and provide permissioned access to the stored disposal record(s) available the content value chain participants (content producers/distributors), thereby facilitating the data forensics and reporting functionality as and when needed.

Data forensics and reporting functional block 116 can provide forensics and dashboards on data usage. For example, the data forensics and reporting functional block 116 can provide compliance records, data access information such as who, what, when and where, and data revocation and associated machine learning model updates. Data forensics and reporting functional block 116 can include elements such as data access and data quality reports, compliance records, and data revocation. The data access and data quality reports element can provide alerts, reports, and dashboards related to data usage, e.g., who, what, when and where, and provide updates on potential enhancements to current data sets. The compliance records element can maintain log of buyer usage for regulatory compliance reporting and law enforcement enquiries. The data revocation element can revoke data sets in data catalog and notify buyers subscribed to datasets and provide credit and settlement for aggrieved parties due to revoked data.

The data supply chain system can record the usage of data by service, micro-services, and/or containers, by date, time, geography, etc., ensures compliance with the contract terms, and also ensures that any machine learning models that had earlier used data that is now revoked for any reason are invalidated. The system is able to report who used the data and for what purpose and when it was used. The module 116 can include dashboards and alerts related to compliance or any violations of contractual terms. Examples may include usage of data for purposes for which it was not intended or contracted.

If for any reason data sets are revoked, that information may be reported to all users who have contracted to use that data and steps are proactively taken to retire such data. The retirement process may include refunds, providing alternate data sources, etc.

If any forensics on the data was provided to a third party, the circumstances under which such information was provided can be recorded in the blockchain. Similarly requests for data quality reports may be logged in the blockchain to prove that reports were provided in a timely fashion. Data revocation records, refunds issued due to data revocation may also be tagged in the blockchain.

The following illustrates an EaaS application example. In an ecosystem of many content producers/distributors, business models, pricing models, consumption patterns and consumption points, the data forensics and reporting functionality can validate and/or correct the distribution of value realized from the sale/transaction, in addition to supporting all regulatory compliance reporting requirements.

Additionally, this functionality can enable system quality and fidelity performance management across multiple classifications, e.g., by cohort group, by data type, by resource type and/or end-to-end processes, can be enabled. This function can maintain the trustworthiness and efficiency of the distributed global marketplace.

Figure 2:
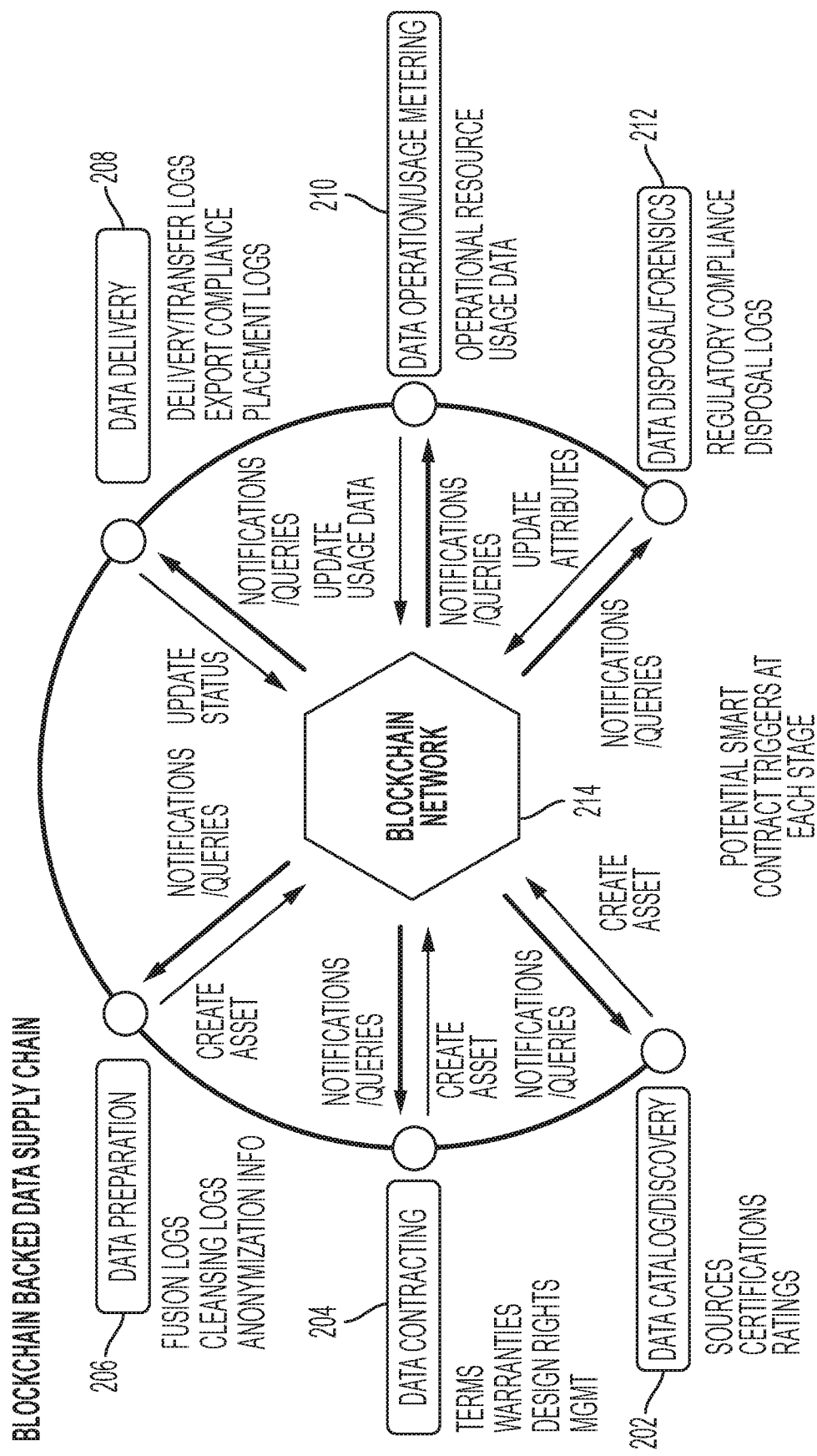
FIG. 2 shows a blockchain backed data supply chain in an embodiment.

FIG. 2 shows a blockchain backed data supply chain in an embodiment. At each stage of the data supply chain (e.g., 202, 204, 206, 208 (data delivery can occur based on data authentication/authorization stage shown at 108 in FIG. 1), 210, 212), information related to specific steps pertaining to that stage may be recorded in the blockchain 214, for example, to increase trust and authenticity and/or enable automation. Smart contracts may be triggered at each stage based on data and events received in the blockchain. Example of a smart contract may include the initiation of a process to completely delete data upon the expiration of a negotiated data contract. Another example can be to kick off a process to prepare the data once a contract is negotiated and payments have been received.

Examples of the applicability of the various aspects of the data supply chain can include, but are not limited to, the media and entertainment industry, e.g., Entertainment as a Service (EaaS) Applications, delivering content, e.g., streaming content on subscription channels; Transport as a Service, Housing as a Service, Software as a Service, Vocational Training as a Service, Tutoring as a Service, Physician as a Service, Drone Flight Path Management, and/or other opportunities, in which there may be a need for automated real-time orchestration of digital workflows while ensuring compliance to an evolving compliance regime.

Figure 3:
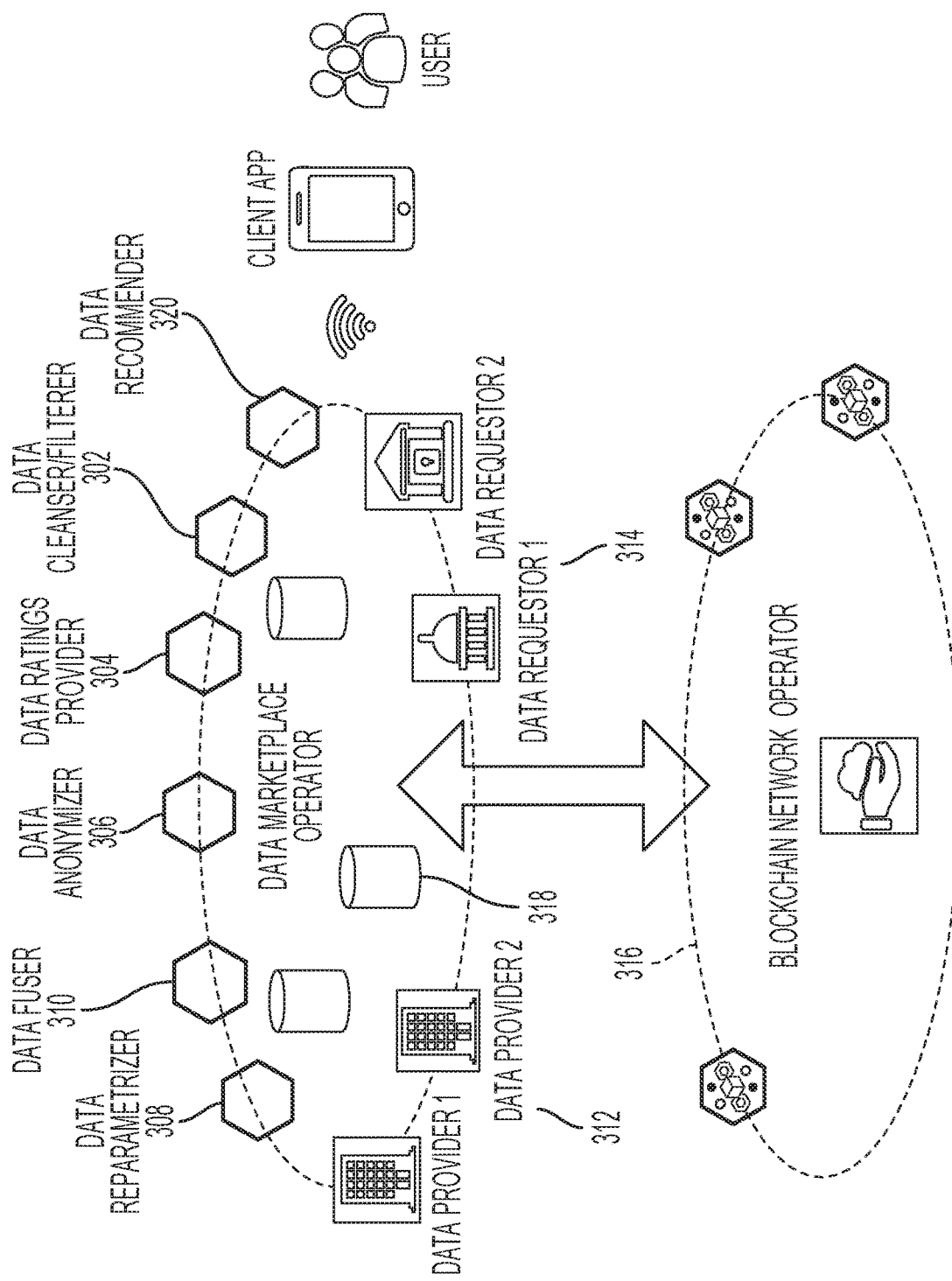
FIG. 3 is a diagram illustrating a data supply chain system in one embodiment.

FIG. 3 is a diagram illustrating a data supply chain system in one embodiment. A data supply chain system is also referred to as a data supply chain ecosystem. The data supply chain ecosystem can have several differences when compared to a traditional data mart. For example, there may be several parties in a data supply chain system in addition to the data providers 312 and data subscribers 314. These include parties such as data cleansers 302, data ratings providers 304, data recommenders such as 320, data reparameterizer 308 and data fuser 310, data anonymizers 306, and/or others. All these parties can work with a data catalog/marketplace operator 318 and can also be part of a blockchain network 316. The data supply chain system in an embodiment also uses the blockchain 316 to record transactions in the supply chain. For instance, details of data providers, contracts established, price, terms, ratings, and/or others, can be recorded into the blockchain 316. For example, for a stage in the data sharing process, details are captured on the blockchain 316. These details may then be used to automate proving of compliance, proof of deletion, provenance of the data, computation of fees, and/or resolution of disputes.

Figure 4A:
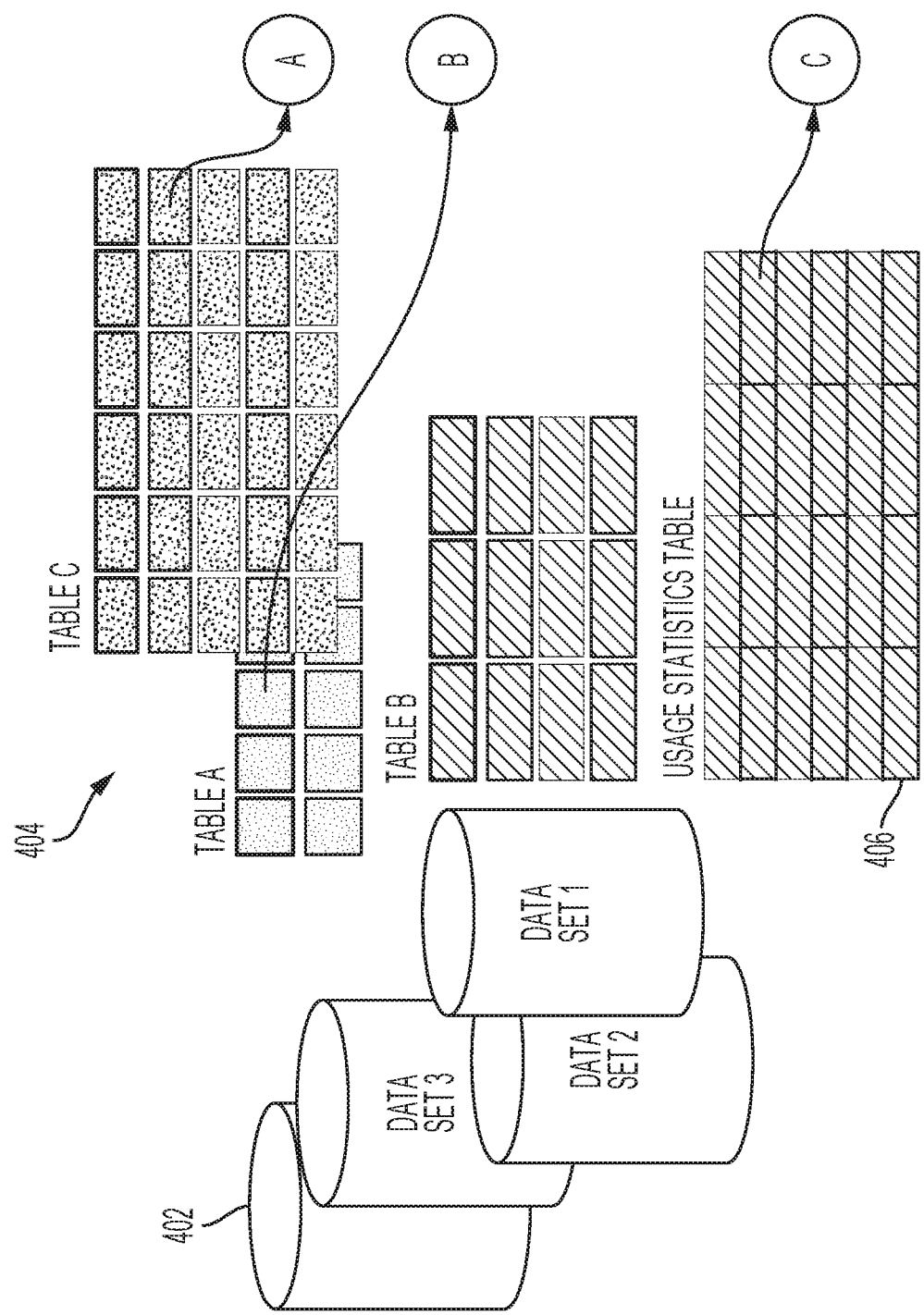
FIGS. 4A, 4B and 4C illustrate a data supply chain data layout in an embodiment.
Figure 4B:
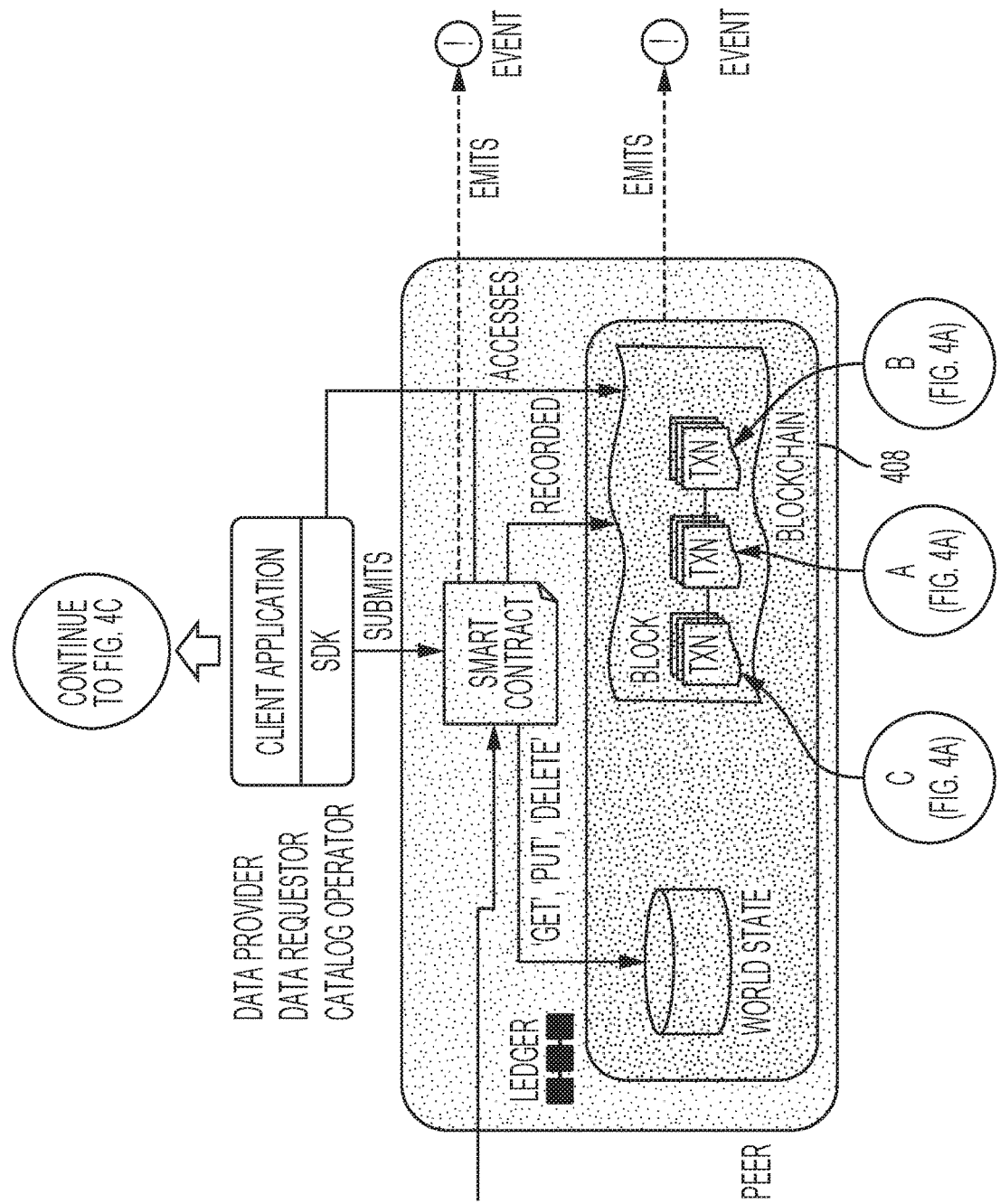
Figure 4C:
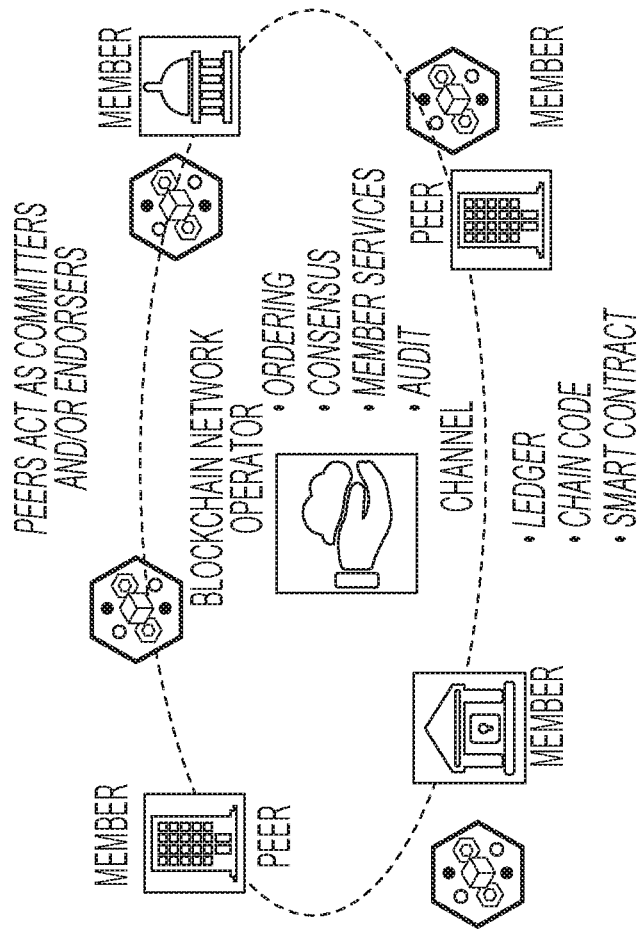

FIGS. 4A, 4B and 4C illustrate a data supply chain data layout in an embodiment. In an embodiment data 402 can be laid out in tables 404. The tables 404 or data can be stored in various types of relational data bases or in non-relational systems. Indexes are built for query optimization. Metadata for information about data models, usage, statistics on data, contract details, price, settlements, and/or other information, may be stored in additional tables 406. In an embodiment, one or more of the tables 404 may be stored in what is denoted the world state in a blockchain network 408. Other tables may be stored in traditional ways.

In an embodiment, the data is laid out such that cells in the tables 404 may contain data and the hashes of such data are stored in the blockchain 408. The hashes may also be stored in the world state to speed up computations, e.g., when security is less of an issue and trust is higher. A peer (e.g., shown at FIG. 4B) can act as committers and/or endorsers of a blockchain network shown in FIG. 4C. FIG. 4B shows a function of a peer or member in a blockchain network in an embodiment. FIG. 4C shows the blockchain network including several members in an embodiment. The members/peers can inspect the data and approve/endorse that a record be added to the blockchain. An example of such a record is that entity A negotiated a contract to use a dataset provided by entity B. With Blockchain Ledgers, each member keeps a copy of the ledger. A member may also be able to initiate a smart contract when the parameters needed to execute the smart contract are available in the blockchain after approval/endorsement by parties that are responsible for that parameter. For example, for parties that agreed to renew a data contract, the smart contract can charge the consumer of the data based on the negotiated terms.

In an embodiment, a data supply chain marketplace can include a front end, which can include catalog information. In an embodiment, the catalog information has certified information about the provenance, usage domains, ratings, bias information about the data, and/or others. In an embodiment, the certification is recorded in the blockchain, e.g., indicating that the data providers can certify their statements about the data. Table 1 shows an example data supply chain catalog.

TABLE 1

| Name | Provider | Description | Price | Services supported by | Origin, Usage | Blockchain Signature of |
|---|---|---|---|---|---|---|
| Cat Pics | CatPhoto | Cats in Loc 1 | $10 | Filtering by geotags, Shadow removal, animated gif sequencing | Ethical Photographers, Cat Food Ads, 4.2 Stars, 87% of cats are white, can't be used in Loc 4, | ABjYum3450Z YNNY67 98cedfg |
| Dog Pics | DogPhoto | Dogs in Loc 2 | $20 | | Amateur dog lover photographers, animated movies, 40% Daschund, No recoloring/ | Ijg1680GHOL S2394csh 50QEEs |
| ABC Sales | DEF Co | Sales of ABC | $100 | Renormalization of sales, subgrouping by product category, filtering to provide only <Z year old products | XKL Inc, Forecasting projects, Anonymized, age X-Y group, | 98HKLSAH4y 9q805yu 5fKWJA |
| Pot Holy | PotHole Inc | Potholes in Loc 3 | $29 | Pothole measurement and geotags | . . . | FHSAIFP490 yHGuyH0 923yr23 |

TABLE 1-continued

| Name | Provider | Description | Price | Services supported by | Origin, Usage | Blockchain Signature of |
|------|----------|-------------|-------|----------------------|---------------|------------------------|
| Weather | WCO | World Weather | $109 | Anomalous weather fields, Normalization by zip code | . . . | 4387y690bjBu ogiaw12 0oihueY |

FIG. 5 shows an example data supply chain user interface in an embodiment. A data supply chain user interface (UI) may include windows or tabs for allowing access to each stage of the data supply chain. In an embodiment, each set of queries on various stages of the data supply chain retrieves information from the usage database and also from the blockchain along with the signatures in the blockchain to provide proof for the transaction. The information in the blockchain is sufficient to prove to auditors, reviewers, and inspectors that the data was entered into the blockchain after a consensus decision was reached agree to enter it.

Figure 6:
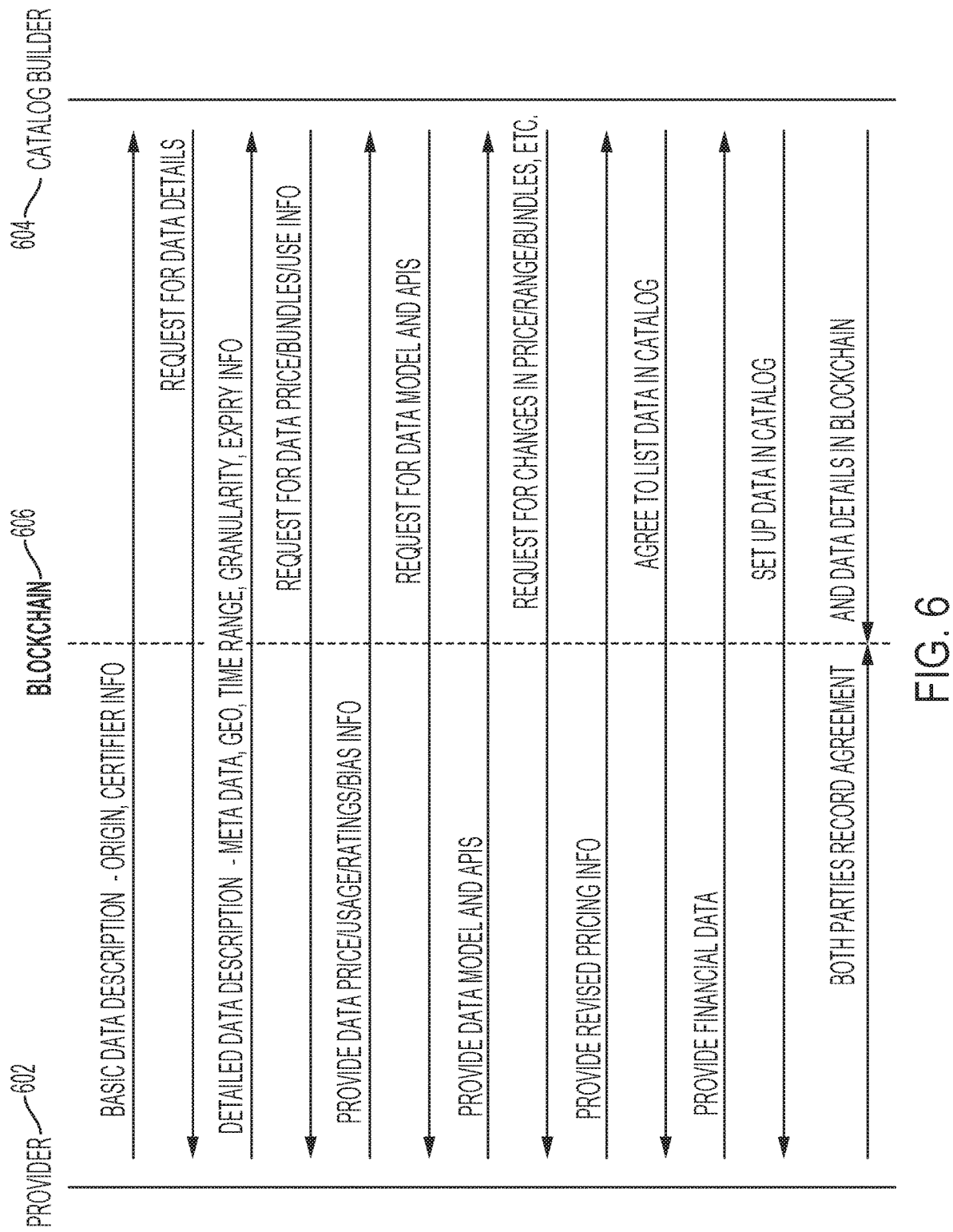
FIG. 6 is a flow diagram illustrating data registration in catalog in an embodiment.

FIG. 6 is a flow diagram illustrating data registration in catalog in an embodiment. Negotiation between a data provider 602 and a catalog builder 604 may terminate at any stage shown in the flow or process. Both the data provider 602 and the catalog builder 604 are parties in the data supply chain system in an embodiment. The catalog builder/operator 604 can provide a separate mechanism to register a data provider 602. The data providers may become aware of catalog operators, e.g., by product publications, advertising, web search, etc. An example, of a data provider can be an airline, which may list its tickets with a marketplace. An embodiment of a system and/or methodology provides permissioned blockchain networks. As a result, each party in the blockchain network is an identified party. And membership services such as those in a blockchain framework (e.g., the Hyperledger Fabric) provide services to onboard members to the blockchain network. As shown, the provider may provide data description such as origin, certifier information and/or others. The catalog builder may request for data details. The provider may provide detailed data description, e.g., metadata, geography, time range, granularity, expiry information, and/or others. The catalog builder may request for data price, bundles, and/or use information. The provider may provide data price, usage, ratings, and bias information. The catalog builder may request for data model and APIs. The provider may provide data model and APIs. The catalog builder may request for changes in price, range, bundles, and/or others. The provider may provide revised pricing information. The catalog builder may agree to list data in catalog. The provider may provide financial data. The catalog builder may set up data in catalog. Both parties record agreement and data details in block chain 606.

Figure 7:
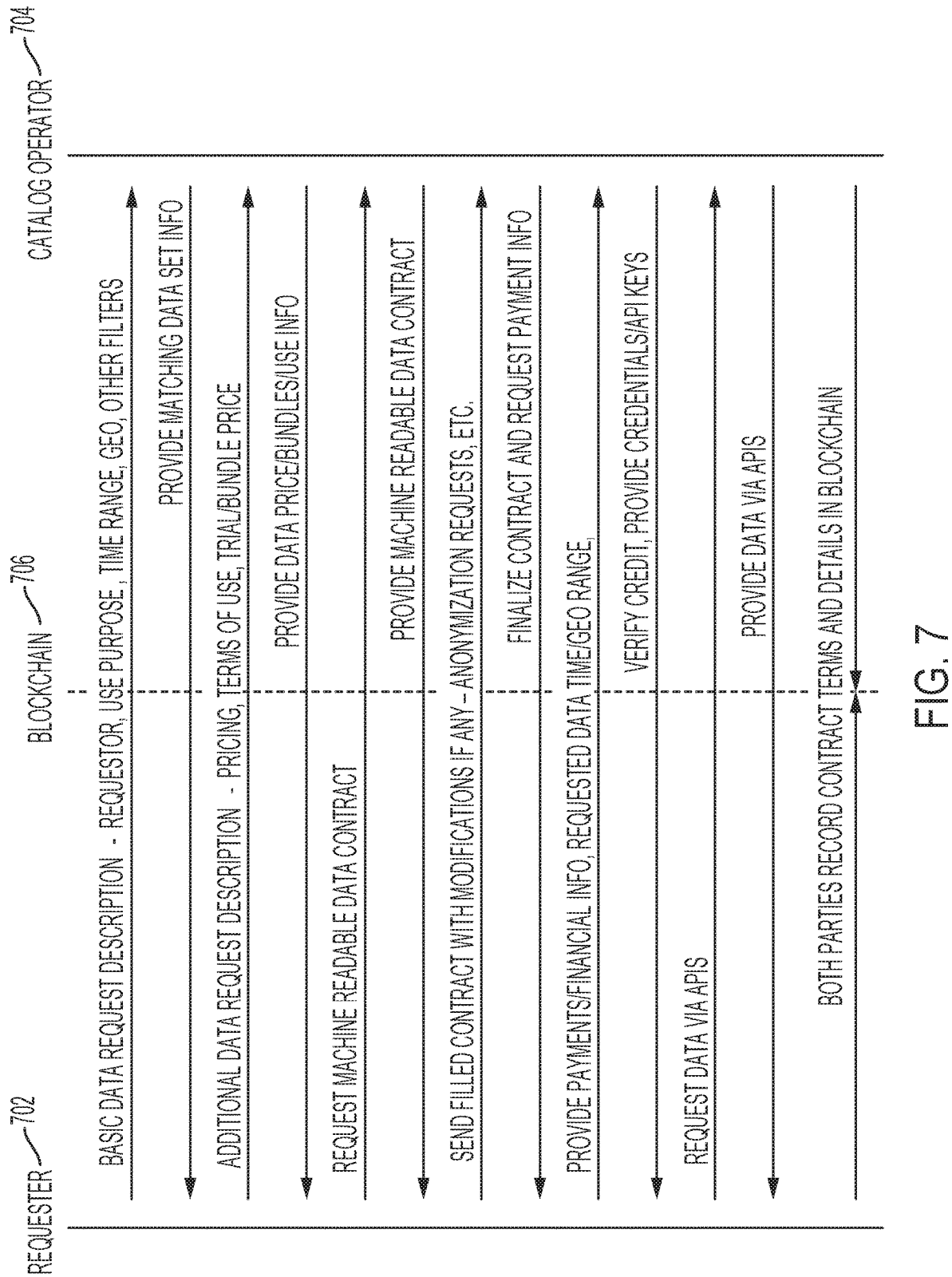
FIG. 7 is a diagram illustrating data contract negotiation in an embodiment.

FIG. 7 is a diagram illustrating data contract negotiation in an embodiment. Negotiation between a requester 702 and a catalog operator 704 may terminate at any stage shown in the flow or process. The catalog operator 704 can be the catalog builder shown in 602 in FIG. 6. Both the requester 702 and the catalog operator 704 are parties in the data supply chain system in an embodiment. The requester may make a data request and provide a description of the requester, use purpose, time range, geography, and/or other filters. The catalog operator may provide matching data set information. The requester may provide additional data request description, e.g., pricing, terms of use, trial or bundle price. The catalog operator may provide price, bundles, and use information. The requester may request a machine readable data contract. The catalog operator may provide a machine readable data contract. The requester may send a completed or filled-in contract with modifications such as anonymization. The catalog operator may finalize contract and request payment information. The requester may provide payments and/or financial information, requested data time and geography range. The catalog operator may verify credit, and provide credentials and/or API keys. The requester may request data via APIs. The catalog operator may provide data via APIs. Both parties record contract terms and details in blockchain 706. The automated flow shown in FIG. 7 may occur after the initial mechanism has taken place to allow the data provider to participate in the network. For example, each provider may have new data the provider wants to bring to the catalog. For instance, a data provider such as an airline may have new seats and routes, etc., over time.

In an embodiment, the data requester, providers, and catalog operators can be part of a blockchain network (e.g., shown in FIGS. 4B and 4C). Details of contracts, price, terms, and/or other information can be recorded into the blockchain.

Figure 8:
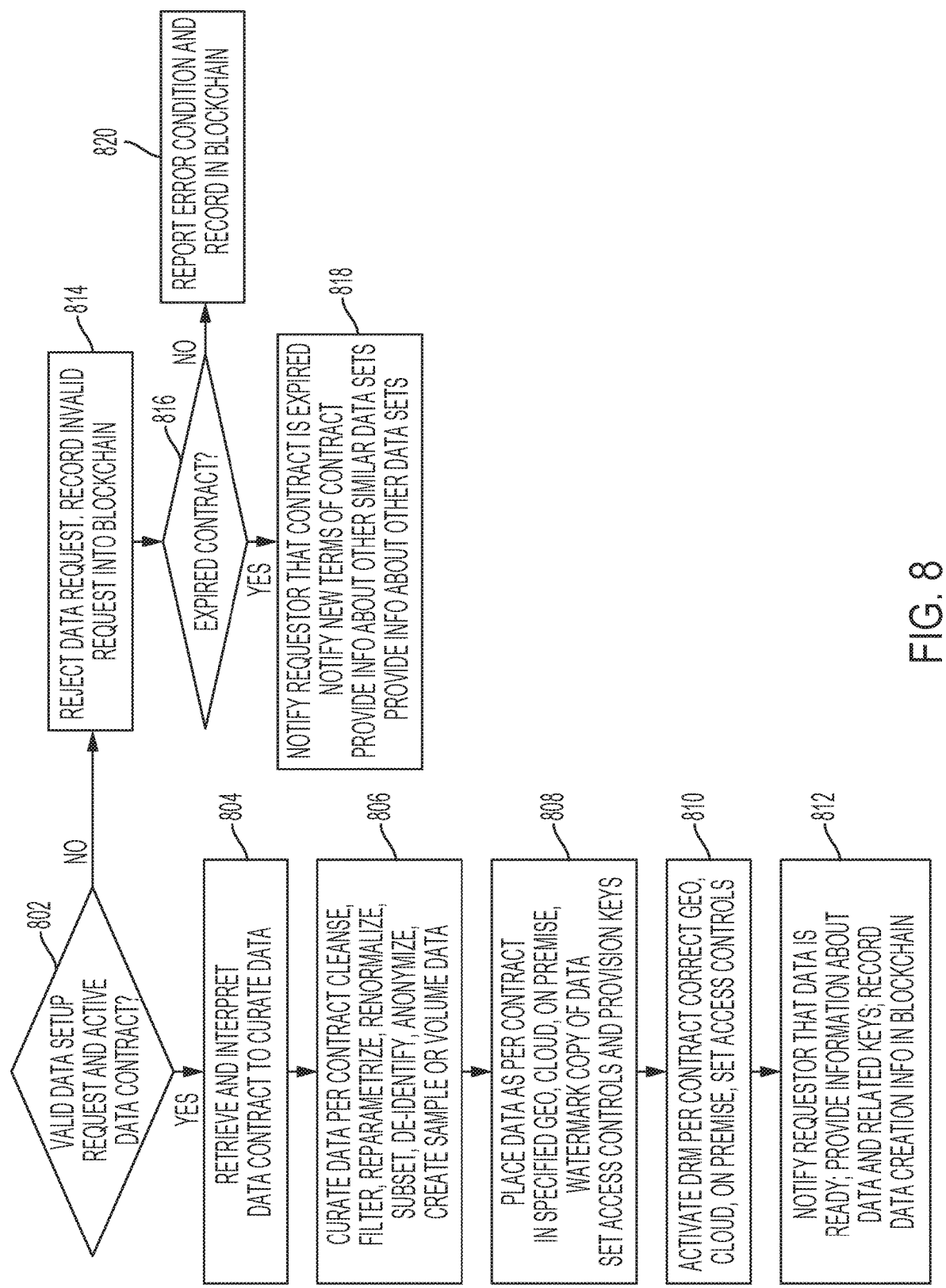
FIG. 8 is a flow diagram illustrating a method of dynamic data preparation and provisioning in an embodiment.

FIG. 8 is a flow diagram illustrating a method of dynamic data preparation and provisioning in an embodiment. For example, a data preparation functional block of a data supply chain may automatically perform the flow shown in FIG. 8. In an embodiment, the data being prepared may be trial data or sample data to facilitate verification of the format of the data. For instance, the provisioning and usage of trial data can verify the usability/appropriateness of the data format(s). As another example, the provisioning and usage of trial data can provide an opportunity for the user/data requestor to determine and/or satisfy the user/data requestor that the data and its affiliated algorithms can deliver the intended results before final contracting. Once the trial of sample data has been curated and tested, the bulk or full data may be curated. In an embodiment, data is prepared as per established contract and keys and access control mechanisms are created and communicated to the requestor. The specific copy of the data may be indicated by inserting a watermark or other identifiable information in the data. Aspects of the data preparation and provisioning can be recorded into the blockchain. At 802, it is determined whether there is a valid data setup request and active data contract. For example, a check can be performed to determine whether the requested data is in the catalog, whether it is coming from an embargoed geography, whether this is a rogue requestor who should be blocked and recorded in the Blockchain for blocking from future requests. If a party is to be blocked, future set up requests can be rejected until the time they are removed from the blocked list.

Responsive to determining that there is a valid data setup request and active data contract, at 804, the data contract is retrieved and interpreted to curate data. At 806, data is curated per contract. Curating, for example, can include cleansing, filtering, reparameterizing, renormalizing, creating a subset, de-identifying, anonymizing, creating a sample or volume data. In an embodiment, sample data may be created first in some situations to first verify the format of data and ensure correctness before incurring the cost to prepare and transmit the complete data set. For example, in a weather data set that is desired for all zip codes within a country for a period of two years may first be sampled for a single zip code and for a period of a week to check and verify the data. As another example, the sample data created can provide an opportunity for the user/data requestor to determine and/or satisfy the user/data requestor that the data and its affiliated algorithms can deliver the intended results.

At 808, the data is placed as per the contract, for example, in specified geography, cloud and/or premise. Copy of data can be watermarked. Access controls can be set and keys can be provisioned.

At 810, DRM can be activated per the contract. Any corrections can be made in geography, cloud, on premise. Access controls can be set.

At 812, a requester is notified that data is ready. Information about the data and related keys can be provided. Data creation information can be recorded in blockchain.

Responsive to determining at 802 that the data setup is not valid or that there is no active data contract, at 814, data request can be rejected. Invalid request information can be recorded in blockchain.

At 816, it is determined whether an existing contract has expired. For example, a processor, which may be executing the method, can lookup the expiration data for the contract to determine whether an existing contract has expired. If so, at 818, the method can include notifying the requester that a contract has expired, and may also notifying the requester of new terms of contract. The method may also include providing information about other similar data sets and providing information about other data sets. For instance, a processor executing the method may automatically compare cataloged attributes of the data with those of other data set, and determine similarity based on the number of matching attributes and/or meeting a threshold value of similarity. For example, similar data sets can be detected automatically by comparing purpose or metadata. For instance, weather data from provider A may have similarity to weather data from provider B based on the meta data description which can include terms like temperature, precipitation, humidity, etc., while the regions or the time horizons they cover may be different. The accuracies of their forecasts may also be different. Such data sets can be deemed similar. In other example cases, users who rate and rank data may also mark and compare similar data sets, e.g., they like data set A over similar data set B because it is more accurate or complete.

At 820, if there are no expired contracts, an error condition can be reported and recorded in blockchain.

Figure 9:
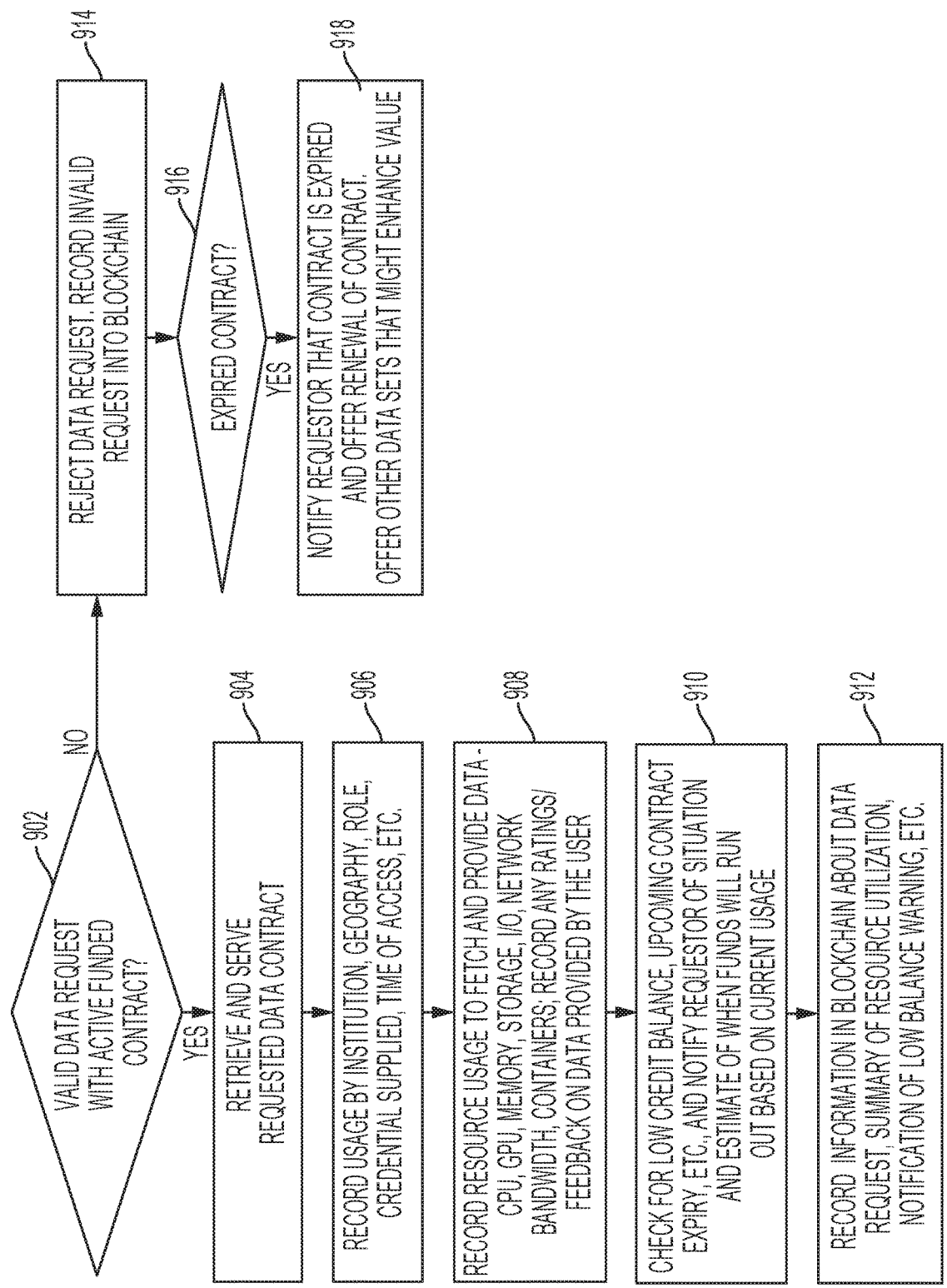
FIG. 9 is a flow diagram illustrating a method of data usage monitoring in an embodiment.

FIG. 9 is a flow diagram illustrating a method of data usage monitoring in an embodiment. For example, a data usage and monitoring functional block of a data supply chain may automatically perform the flow shown in FIG. 9. Data usage monitoring method can monitor the usage of data and auxiliary resources used to provide the data. Data usage can be tracked by geography, time, access role, and by another filter or criterion. Data usage monitoring method may also proactively issue reminders for contract renewals before funding is depleted. Aspects of this process can be recorded in the blockchain.

At 902, it is determined whether there is a valid data request with active funded contract. If so, at 904, a method may include retrieving and serving a requested data contract. At 906, the method may include recording usage by institution, geography, role, credential supplied, time of access, and/or other information, e.g., associated with usage. At 908, the method may include recoding resource usage to fetch and provide data, e.g., CPU, GPU, memory, storage, I/O, container, network bandwidth. Any ratings and/or feedback on data provided by the user can be recorded. At 910, the method may include checking for low credit balance, upcoming contract expiry, and/or other information, and notifying the requester of a situation and estimate of when funds will run out based on current usage. At 912, the method may include recording information in blockchain about a data request, summary of resource utilization, notification of low balance warning, and/or other information. Responsive to determining that there is no valid data request at 902, the method may include at 914, rejecting the data request and recording invalid request information into blockchain. At 916, it is determined whether the contract has expired. If so, at 918, the method may include notifying the requester that a contract is expired and offering renewal of contract. The method may also include offering other data sets that may enhance value to the requester. For instance, if the requestor was using a weather data set and now there is a newer weather data set that is more accurate or can predict further out in terms of forecast, the newer data set may be recommended. In other example cases, based on user reviews, another user may rate local event data as something that helped with demand forecasts. The methodology in an embodiment may recommend local event data to others who are working on demand forecasting and have subscribed to data sets for demand forecasting.

Figure 10:
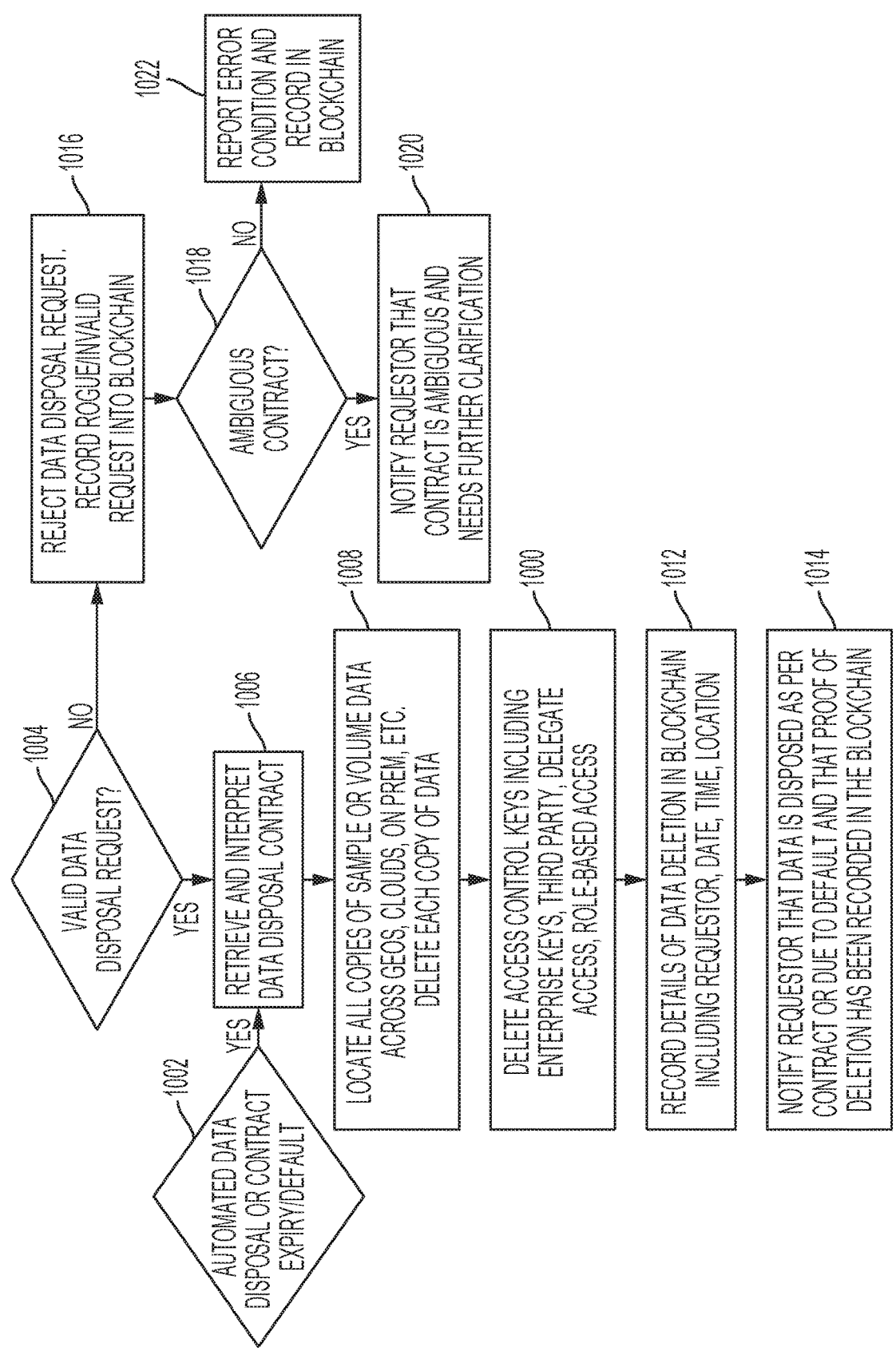
FIG. 10 is a flow diagram illustrating a method of data disposal in an embodiment.

FIG. 10 is a flow diagram illustrating a method of data disposal in an embodiment. For example, a data disposal functional block of a data supply chain may automatically perform the flow shown in FIG. 10. Data disposal may be triggered in response to a submitted request or automatically as part of data contract terms or upon expiry of data contract or on default on contract (e.g., payment not received). Contract terms may specify that certain data be deleted after a specified period of time, after a specified number of uses (to minimize cost for example). The details of the process of deletion can be recorded in the blockchain.

Retrieving and interpreting data disposal contract at 1006 can be triggered based on determining that a valid data disposal request has been received at 1004, and/or automatically determining contract expiration or default at 1002. At 1008, the method can include locating all copies of sample or volume data across geographies, clouds, on premise machines, and/or others where the data was placed. Each copy of the data is deleted. At 1010, the method can include deleting access control keys, including enterprise keys, third party, delegate accesses, and/or role-based access keys. At 1012, the method can include recording details of data deletion in blockchain, for example, including requester, date, time and location, and/or another information. At 1014, the method can include notifying the requester that data is disposed as per the contract and/or due to default and that proof of deletion has been recorded in the blockchain.

Responsive to determining that the data disposal request is not valid at 1004, the method can include at 1016, rejecting the data disposal request and recording an invalid request into blockchain. At 1018, it is determined whether the contract is ambiguous. For example, the user may be asking to delete data that was not marked for deletion as part of this data request, in which case the contract can be determined to be ambiguous. If so, at 1020, the method can include notifying the requester that the contract is ambiguous and needs further clarification. If it is determined that the contract is not ambiguous, the method can include at 1022, reporting an error condition and recoding the error in blockchain.

Figure 11:
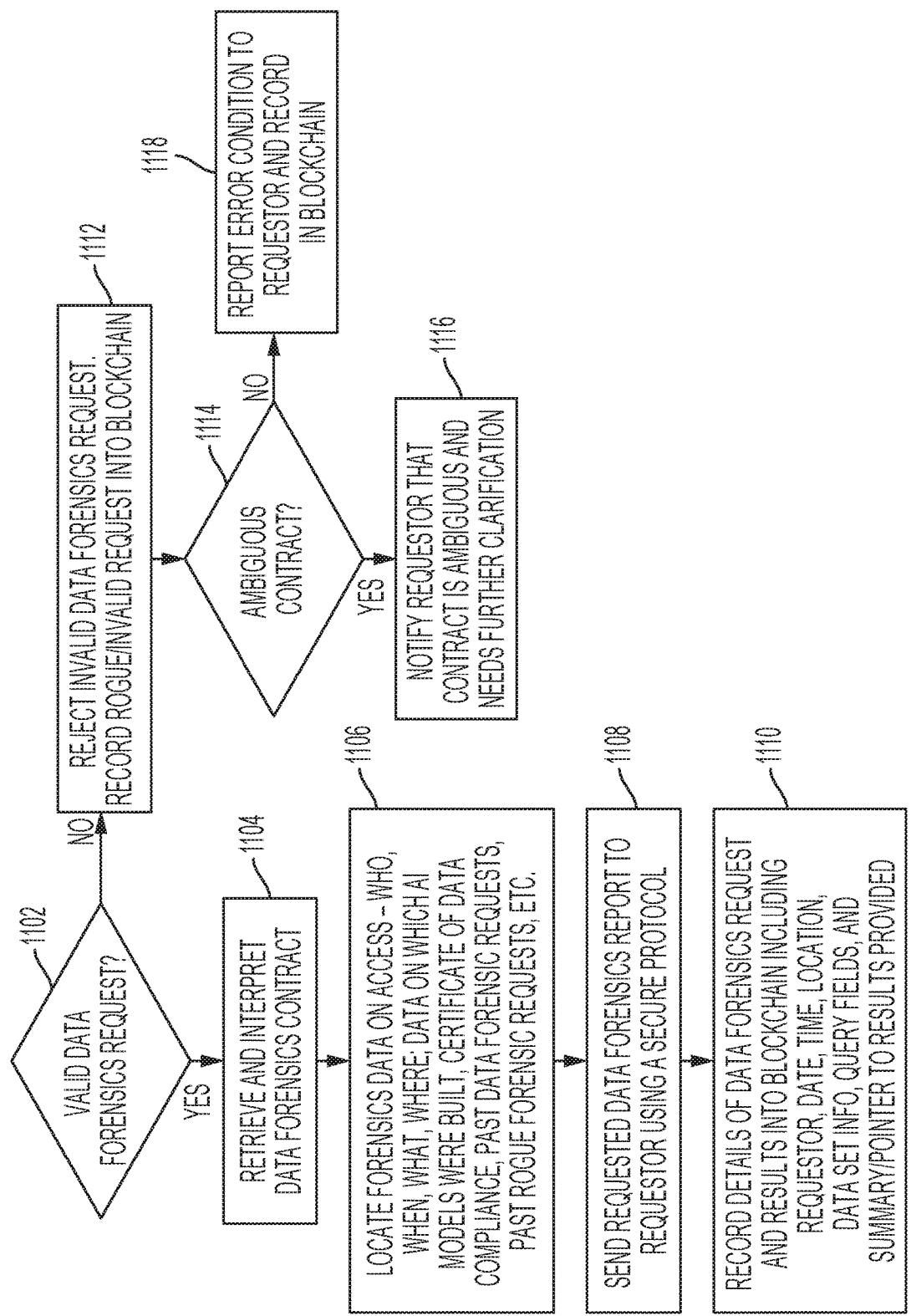
FIG. 11 is a flow diagram illustrating a method of data forensic in an embodiment.

FIG. 11 is a flow diagram illustrating a method of data forensic in an embodiment. For example, a data forensic and reporting functional block of a data supply chain may automatically perform the flow shown in FIG. 11. The request can be triggered by an entity that wants the data forensics report. In an embodiment, data forensics responds to a request to provide information/forensics on who accessed the data, how many times it was accessed, from where it was accessed, and/or others. The details of the request and the responses to the requests can be also recorded on the blockchain.

At 1102, the method includes determining whether a data forensics request, for example, received via a data supply chain user interface, is valid. For example, the method in an embodiment can check whether the requesting entity has rights or has authority to request such a forensics request. At 1104, the method may include retrieving and interpreting the data forensics request. At 1106, the method may include locating forensics data on access, e.g., who, when, what, and where, data on which AI models were built, certificate of data compliance, past data forensic requests, past erroneous or invalid forensic requests, and/or others. For example, the method may include searching on the usage monitoring data that is gathered. The monitoring data can include, but not limited to, data gathered (e.g., described with reference to FIG. 9), data deleted (e.g., described with reference to FIG. 10), and data with renewal requests processed, etc.

At 1108, the method may include sending the requested data forensics report to the requester using a secure protocol. At 1110, the method can include recording details of data forensics request and results into blockchain. Information recorded can include requester information, date, time, location, data set information, query fields, and summary or a pointer to results provided.

Responsive to determining that the data forensics request is not valid at 1102, the method can include at 1112, rejecting the invalid data forensics request and recording the invalid request into blockchain. At 1114, it is determined whether the contract is ambiguous. If so, at 1116, the method can include notifying the requester that the contract is ambiguous and needs further clarification. If it is determined that the contract is not ambiguous, the method can include at 1118, reporting an error condition and recoding the error in blockchain.

Figure 12:
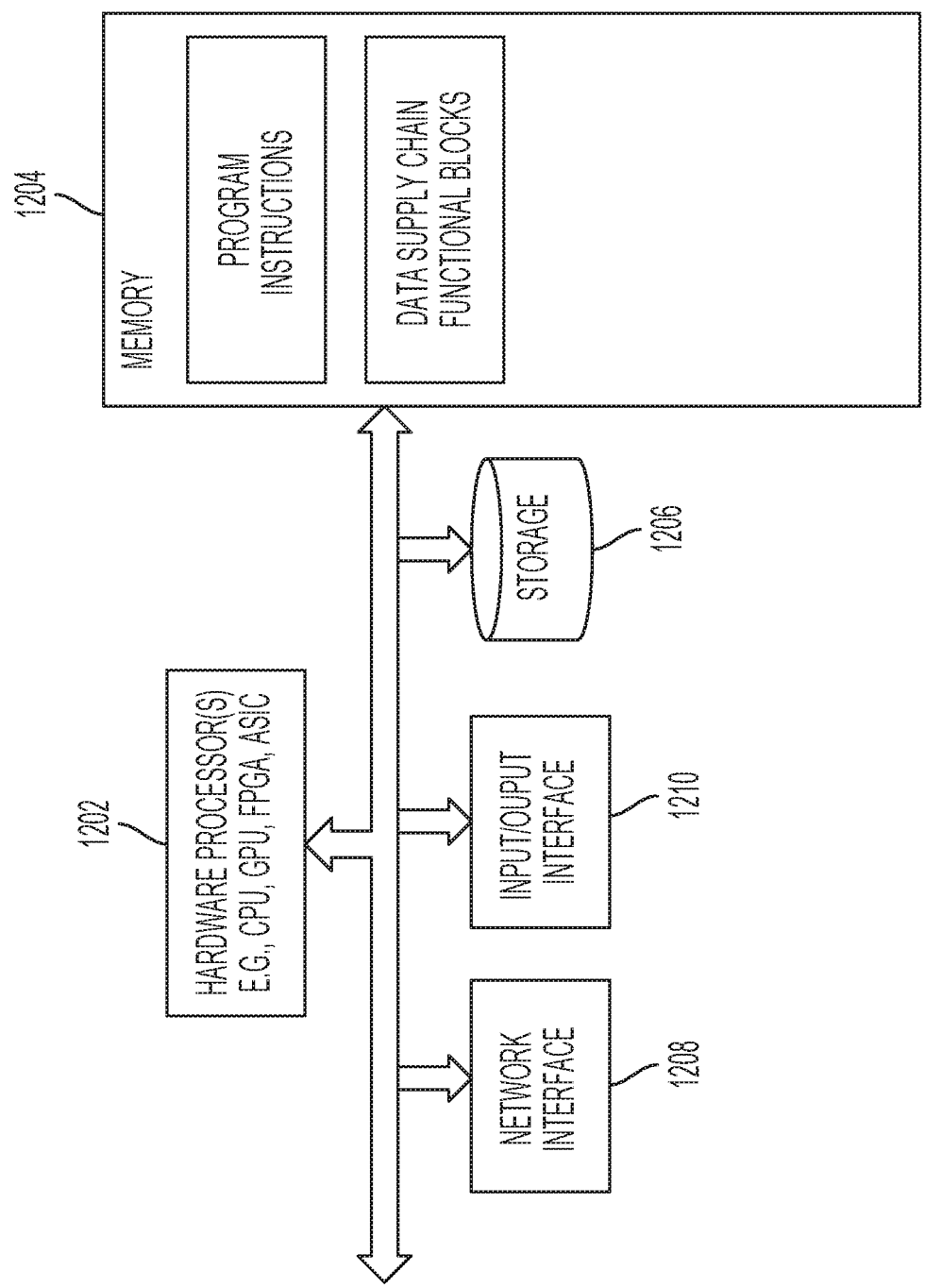
FIG. 12 is a diagram showing components of a system in one embodiment that can provide a data supply chain.

FIG. 12 is a diagram showing components of a system in one embodiment that can provide a data supply chain. One or more hardware processors 1202 such as a central processing unit (CPU), a graphic process unit (GPU), and/or a Field Programmable Gate Array (FPGA), an application specific integrated circuit (ASIC), and/or another processor, may be coupled with a memory device 1204, and perform one or more functions of the data supply chain, for example, one or more of the functional blocks. A memory device 1204 may include random access memory (RAM), read-only memory (ROM) or another memory device, and may store data and/or processor instructions for implementing various functionalities associated with the methods and/or systems described herein. One or more processors 1202 may execute computer instructions stored in memory 1204 or received from another computer device or medium. A memory device 1204 may, for example, store instructions and/or data for functioning of one or more hardware processors 1202, and may include an operating system and other program of instructions and/or data. At least one hardware processor 1202 may perform functions of one or more of the functional blocks of a data supply chain. Various data may be stored in a storage device 1206 or received via a network interface 1208 from a remote device, and may be temporarily loaded into a memory device 1204 for performing one or more functions. One or more hardware processors 1202 may be coupled with interface devices such as a network interface 1208 for communicating with remote systems, for example, via a network, and an input/output interface 1210 for communicating with input and/or output devices such as a keyboard, mouse, display, and/or others. The computer system may be practiced in distributed cloud computing environments.

Figure 13:
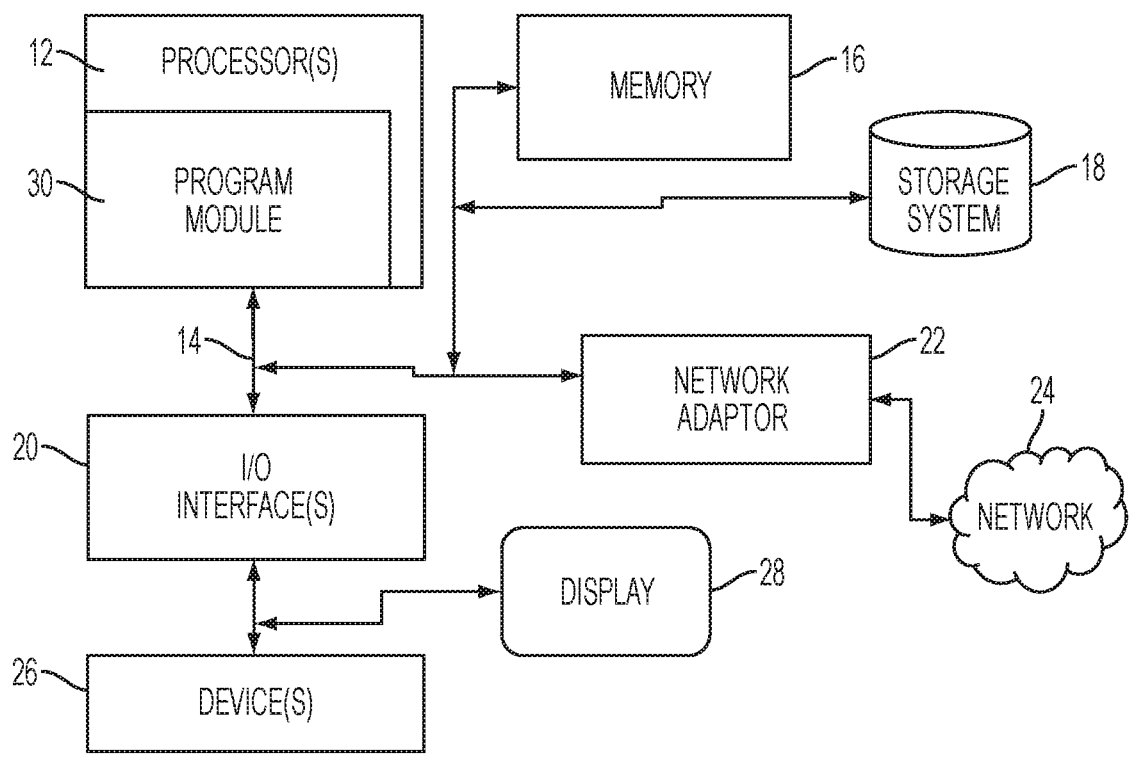
FIG. 13 illustrates a schematic of an example computer or processing system that may implement a system in an embodiment.

FIG. 13 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 13 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
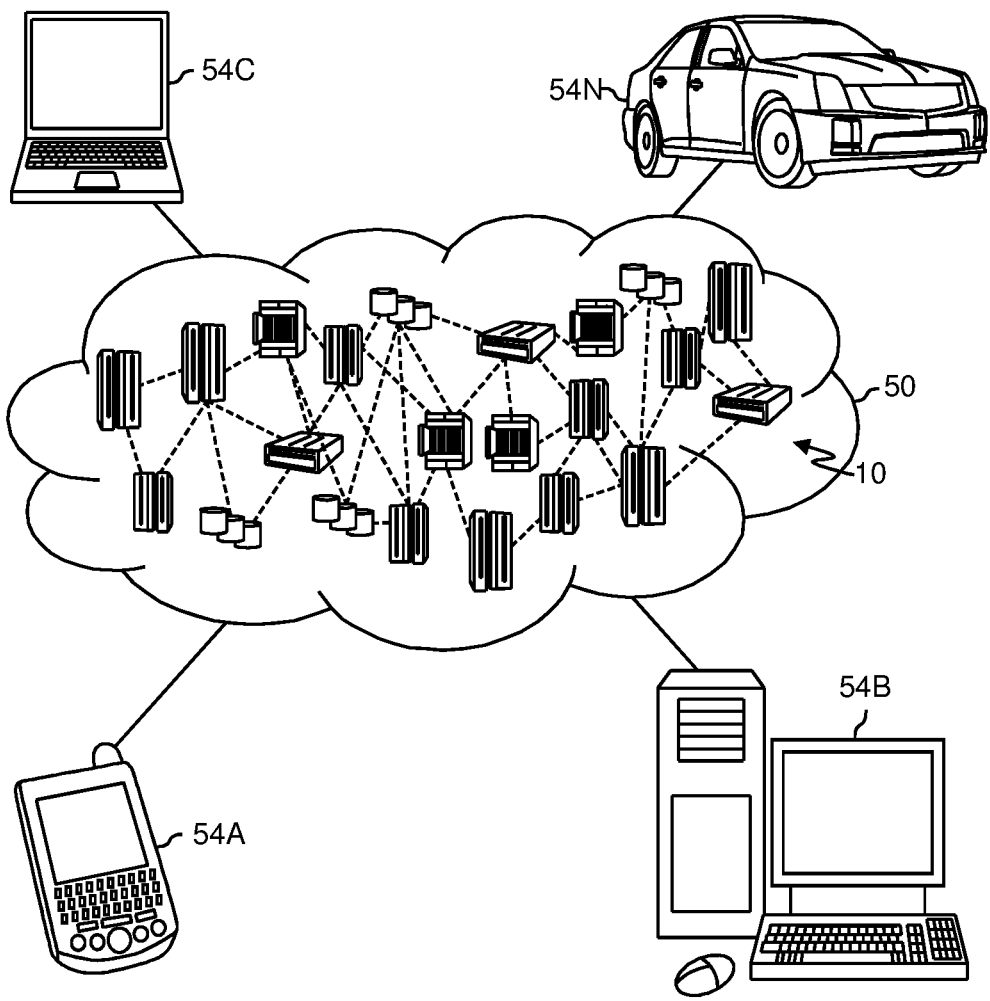
FIG. 14 illustrates a cloud computing environment in an embodiment.

Referring now to FIG. 14, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 14 are intended to be illustrative only and that computing nodes 10 and cloud computing environment 50 can communicate with any type of computerized device over any type of network and/or network addressable connection (e.g., using a web browser).

Figure 15:
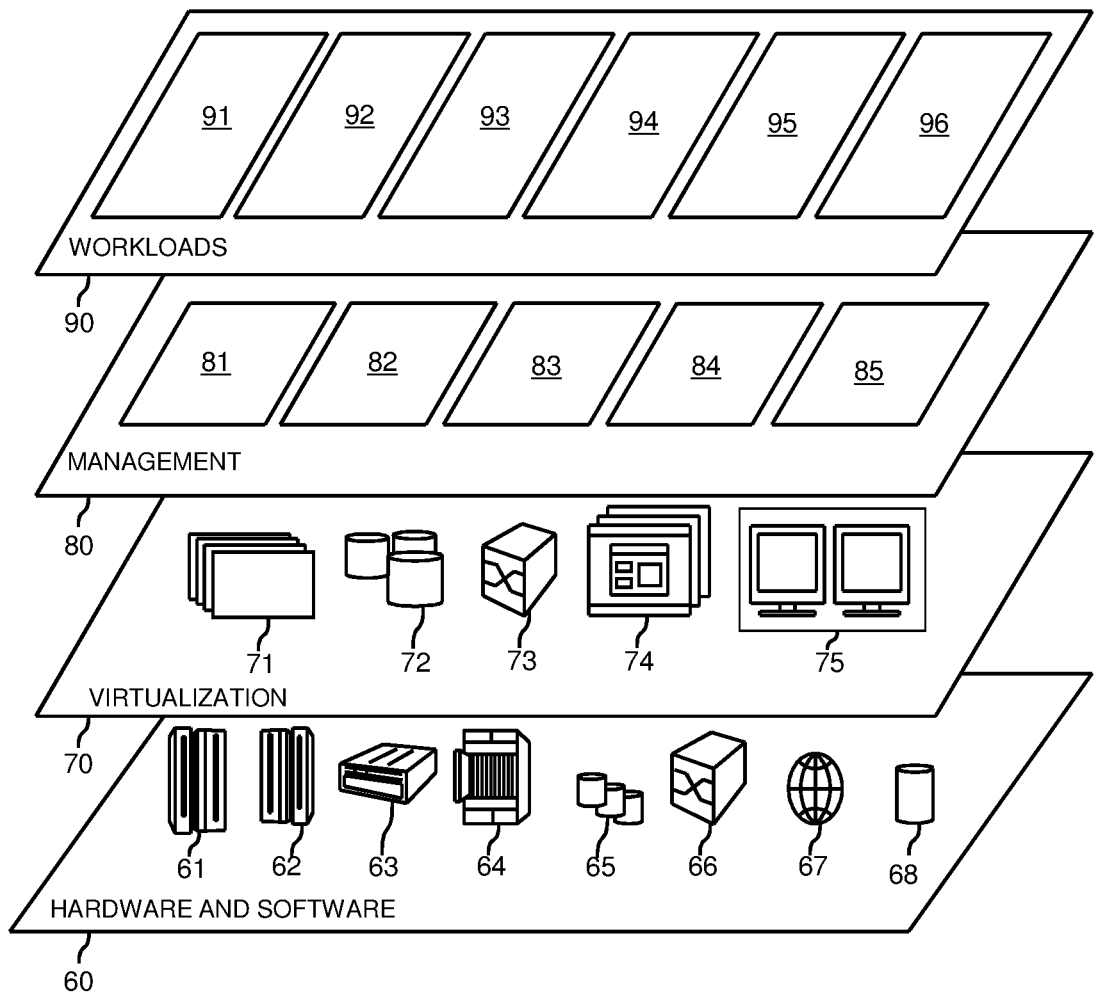
FIG. 15 illustrates a set of functional abstraction layers provided by cloud computing environment in an embodiment.

Referring now to FIG. 15, a set of functional abstraction layers provided by cloud computing environment 50 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data supply chain processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A data supply chain system comprising:
   a hardware processor;
   a memory device coupled with the hardware processor;
   the hardware processor configured to at least:
   facilitate discovery and cataloging of data;
   facilitate automated data contract negotiation associated with the data;
   prepare and authenticate the data based on the data contract, wherein responsive to authenticating the data, the hardware processor is further configured to automatically provide access to at least a microservice for data access;
   monitor data usage of the data at least at a level of the micro-service;
   perform automatic data contract settlement;
   responsive to automatically determining expiry of the data contract, perform data disposal; and
   perform automatic data forensics including at least invalidating a machine learning model that used the data that is revoked, checking compliance with data contract terms and regulatory requirements, and logging usage of the data by services and micro-services by date, time and geography, the automatic data forensics further including identifying machine learning models that were built on the data, wherein the hardware processor is configured to record information associated with discovering, facilitating, preparing, monitoring, performing automatic data contract settlement, performing data disposal and performing automatic data forensics.

2. The system of claim 1, wherein the hardware processor is configured to record the information in blockchain.

3. The system of claim 1, wherein the hardware processor is configured to catalog data to include attributes and data description associated with the data.

4. The system of claim 3, wherein the data description includes at least a data model, an application programming interface (API) and metadata associated with the data.

5. The system of claim 1, wherein the hardware processor is configured to automatically negotiate data request, data pricing and terms and data payment using a machine readable contract.

6. The system of claim 1, wherein the hardware processor is configured to automatically curate the data, automatically perform sample testing of the data, and place the data in a geographic location, to prepare the data.

7. The system of claim 6, wherein the hardware processor curates the data at least by cleansing and anonymizing the data.

8. The system of claim 6, wherein the hardware processor is configured to create a credential for accessing the data.

9. The system of claim 1, wherein the hardware processor is configured to monitor usage by a filter.

10. The system of claim 1, wherein the hardware processor is configured to monitor auxiliary usage associated with usage of data.

11. The system of claim 10, wherein the auxiliary usage includes at least one of processor usage, memory usage, storage usage, input/output usage, container, virtual machine, and network usage.

12. The system of claim 1, wherein the hardware processor is configured to automatically delete a machine learning model trained using the data and information obtained from the machine learning model, in disposing the data.

13. A computer-implemented data supply chain method, comprising:

facilitating discovery and cataloging of data;

facilitating automated data contract negotiation associated with the data;

preparing and authenticating the data based on the data contract, wherein responsive to authenticating the data, the hardware processor is further configured to automatically provide access to at least a micro-service for data access;

monitoring data usage of the data at least at a level of the micro-service;

performing automatic data contract settlement;

responsive to automatically determining expiry of the data contract, performing data disposal; and performing automatic data forensics including at least invalidating a machine learning model that used the data that is revoked, checking compliance with data contract terms and regulatory requirements, and logging usage of the data by services and micro-services by date, time and geography, the automatic data forensics further including identifying machine learning models that were built on the data, wherein information associated with discovering, facilitating, preparing, monitoring, performing automatic data contract settlement, performing data disposal and performing automatic data forensics are recorded.

14. The method of claim 13, wherein the cataloged data further includes at least attributes and data description associated with the data.

15. The method of claim 14, wherein the data description includes at least a data model, an application programming interface (API) and metadata associated with the data.

16. The method of claim 13, wherein the facilitating automated data contract negotiation associated with the data includes automatically negotiating a data request, data pricing and terms and data payment using a machine readable contract.

17. The method of claim 13, wherein the preparing of the data includes at least automatically curating the data, automatically performing sample testing of the data, and placing the data in a geographic location.

18. The method of claim 13, wherein the curating includes at least cleansing and anonymizing the data.

19. The method of claim 13, wherein the monitoring includes at least monitoring data usage and auxiliary usage associated with usage of data.

20. A computer program product comprising a non-transitory computer readable storage medium having program instructions embodied therewith, the program instructions executable by a device to cause the device to:

facilitate discovery and cataloging data;

facilitate automated data contract negotiation associated with the data;

prepare and authenticate the data based on the data contract, wherein responsive to authenticating the data, the hardware processor is further configured to automatically provide access to at least a micro-service for data access;

monitor data usage of the data at least at a level of the micro-service;

perform automatic data contract settlement;

responsive to automatically determining expiry of the data contract, perform data disposal; and perform automatic data forensics including at least invalidating a machine learning model that used the data that is revoked, checking compliance with data contract terms and regulatory requirements, and logging usage of the data by services and micro-services by date, time and geography, the automatic data forensics further including identifying machine learning models that were built on the data, wherein the hardware processor is configured to record, information associated with discovering, facilitating, preparing, monitoring, performing automatic data contract settlement, performing data disposal and performing automatic data forensics.

* * * * *